(12) United States Patent
Jollivet et al.

(10) Patent No.: US 10,879,665 B2
(45) Date of Patent: Dec. 29, 2020

(54) OPTICAL AMPLIFYING SYSTEMS AND METHODS

(71) Applicant: Nufern, East Granby, CT (US)

(72) Inventors: Clemence Jollivet, Ellington, CT (US); Kevin Farley, South Windsor, CT (US); Kanishka Tankala, South Windsor, CT (US); John Edgecumbe, Madison, CT (US)

(73) Assignee: Nufern, East Granby, CT (US)

( * ) Notice: Subject to any disclaimer, the term of this patent is extended or adjusted under 35 U.S.C. 154(b) by 380 days.

(21) Appl. No.: 15/897,900

(22) Filed: Feb. 15, 2018

(65) Prior Publication Data

US 2018/0233875 A1 Aug. 16, 2018

Related U.S. Application Data

(60) Provisional application No. 62/459,443, filed on Feb. 15, 2017.

(51) Int. Cl.
*H01S 3/067* (2006.01)
*H01S 3/16* (2006.01)
(Continued)

(52) U.S. Cl.
CPC ...... *H01S 3/06754* (2013.01); *H01S 3/06733* (2013.01); *H01S 3/0941* (2013.01); *H01S 3/094007* (2013.01); *H01S 3/094053* (2013.01); *H01S 3/1616* (2013.01); *H01S 3/1618* (2013.01); *H01S 3/09408* (2013.01); *H01S 3/09415* (2013.01); *H01S 3/094011* (2013.01)

(58) Field of Classification Search
CPC ............ H01S 3/06754; H01S 3/06733; H01S 3/094007; H01S 3/094053
See application file for complete search history.

(56) References Cited

U.S. PATENT DOCUMENTS 7,991,255 B2 8/2011 Salokatve
10,014,648 B2 * 7/2018 Kashiwagi ........ H01S 3/094007
(Continued)

FOREIGN PATENT DOCUMENTS

EP 1246321 A2 10/2002

OTHER PUBLICATIONS

International Preliminary Report on Patentability, International Patent Application No. PCT/US2018/018387, dated Aug. 20, 2019.

*Primary Examiner* — Eric L Bolda
(74) *Attorney, Agent, or Firm* — McDonnell Boehnen Hulbert & Berghoff LLP

(57) ABSTRACT

The present disclosure relates to systems and methods for reducing thermal effects in double-clad clad optical fiber amplifying systems via control of the pump absorption. One optical fiber amplifying system for reducing thermal effects includes one or more first optical pump sources, each configured to output radiation of a pump wavelength, a bridge optical fiber, having an input configured to receive the radiation of the pump wavelength output by the one or more first optical pump sources and an output, and an active optical fiber that has a first end substantially directly coupled to the output of the bridge optical fiber and a second end. The active optical fiber is configured to amplify radiation of the first active wavelength when pumped with radiation of the pump wavelength.

23 Claims, 32 Drawing Sheets

(51) Int. Cl.
*H01S 3/0941* (2006.01)
*H01S 3/094* (2006.01)

(56) References Cited

U.S. PATENT DOCUMENTS

| | | |
|---|---|---|
| 10,156,675 B1 * | 12/2018 | Johnson ................ H01S 3/1022 |
| 10,630,040 B2 * | 4/2020 | Jollivet ................ H01S 3/0804 |
| 2007/0280597 A1 * | 12/2007 | Nakai ................... G02B 6/2835 |
| | | 385/43 |
| 2008/0018989 A1 | 1/2008 | Tanigawa |
| 2010/0278486 A1 * | 11/2010 | Holland ................ G02B 6/262 |
| | | 385/43 |
| 2011/0075252 A1 | 3/2011 | Frith |
| 2012/0219026 A1 * | 8/2012 | Saracco ............. H01S 3/06754 |
| | | 372/21 |
| 2012/0262781 A1 * | 10/2012 | Price ....................... G02B 6/14 |
| | | 359/341.3 |

* cited by examiner

OPTICAL AMPLIFYING SYSTEMS AND METHODS

CROSS-REFERENCE TO RELATED APPLICATIONS

This application claims the benefit of priority of U.S. Provisional Patent Application No. 62/459,443, filed Feb. 15, 2017, which is hereby incorporated herein by reference in its entirety.

BACKGROUND OF THE DISCLOSURE

1. Field of the Disclosure

The present disclosure relates generally to optical fiber lasers and amplifiers. The present disclosure relates more particularly to systems and methods for locally tailoring the pump absorption, e.g., for reducing thermal effects in double-clad optical fiber amplifying systems.

2. Technical Background

Optical fiber lasers and amplifiers are known in the art. In such lasers and amplifiers, rare earth materials disposed in the core of an active optical fiber absorb pump radiation of a predetermined wavelength, and, in response, provide or amplify light of a different wavelength for propagation in the core. For example, the well-known erbium-doped fiber amplifier receives pump radiation having a wavelength of 980 or 1480 nm, and amplifies optical radiation propagating in the core and having a wavelength of about 1550 nm. Lasers and amplifiers generally include one or more amplifier stages, each including a length of active optical fiber that is coupled to one or more pump radiation sources pump lasers) and configured to amplify optical radiation passing through its core.

The output power of optical fiber lasers and amplifiers is being continuously scaled up by optical system designers. One way to increase the power output of optical fiber lasers and amplifiers is to use a double-clad optical fiber as the amplifying fiber. As is familiar to the person of ordinary skill in the art, a double-clad optical fiber has an active core (e.g., doped with a rare earth such as ytterbium, thulium, praseodymium, holmium, erbium, or neodymium), a pump cladding surrounding the core and configured to guide radiation of an amplified wavelength within the core, and one or more outer claddings surrounding the pump cladding and configured to guide radiation of a pump wavelength within the pump cladding and the core. Double-clad optical fibers can be designed, for example, with a pump cladding having a non-circular cross-section. This design feature may allow a greater overlap of pump radiation with the active core of the active optical fiber, thereby leading to increased absorption and increased output power per given length of fiber.

However, attempting to scale the output power in such a manner can introduce problems into the system, such as adverse thermal effects. These thermal effects can arise from the absorption of pump or source light by impurities within the active optical fiber, which can create color centers or otherwise result in thermal fiber damage. Additionally, low splicing quality or a mismatch of cladding sizes between fibers in the system can result in undesirable heating in the neighborhood of the splice.

Thus, in order for optical fiber amplifiers and lasers to reach their full output power potential, an effective means of handling the thermal effects in such systems without adversely affecting other aspects of the system, such as overall pump absorption or laser efficiency, is needed.

Unless otherwise indicated herein, the materials described in this section are not prior art to the claims in this application and are not admitted to be prior art by inclusion in this section.

SUMMARY OF THE DISCLOSURE

The specification and figures disclose embodiments that can be used to locally tailor the pump absorption in the section of an active optical fiber closest to a pump source, e.g., to reduce thermal effects in double-clad optical fiber amplifying systems.

The inventors have noted that one intrinsic loss due to the pumping process results from the so-called quantum defect. The quantum defect is defined as the ratio of the pump wavelength to the laser wavelength, and as such acts as a measure of the amount of pump energy that is not carried by the amplified radiation, and thus is converted to heat within the fiber. Such heat can result in negative thermal effects. This can be particularly problematic in active optical fibers doped with elements having high quantum defect values, such as thulium, for example. The quantum defect value for thulium is about 0.4, as compared to a 0.89 value for ytterbium, resulting in roughly twice as much heat generation from the quantum defect for thulium as compared to ytterbium. Moreover, thulium-doped active optical fibers are typically doped with higher concentrations of rare earth than ytterbium-doped active optical fibers. In state-of-the-art "2-for-1" thulium processes, the quantum defect can effectively be much higher, but even higher thulium concentrations are typically used to achieve such effects. Accordingly, heat generation can be a much bigger problem in thulium-based systems than in ytterbium-based systems.

Thermal effects in the active optical fiber of an optical fiber amplifying system are typically most pronounced within the portion of the active optical fiber that is nearest to the pump optical source (e.g., within a few centimeters of the end of the fiber coupled to the pump source). This can be particularly problematic near fusion splices, as fusion splices are typically the weakest portions of the system, in terms of mechanical strength and stability. This results in a significant limit to power scaling of conventional thulium-doped amplifying systems.

In one aspect, the disclosure describes an optical fiber amplifying system. The optical fiber amplifying system provides amplified optical radiation having an active wavelength. The optical fiber amplifying system includes one or more first optical pump sources, each configured to output radiation of a pump wavelength. The optical fiber amplifying system also includes a bridge optical fiber, having an input configured to receive the radiation of the pump wavelength output by the one or more first optical pump sources and an output. The bridge optical fiber includes an inner core configured to guide radiation of the active wavelength. The inner core has an inner core active wavelength refractive index profile and an inner core pump wavelength refractive index profile. The bridge optical fiber also includes an annular pump core disposed about the inner core configured to guide radiation of the pump wavelength. The annular pump core has an annular pump core active wavelength refractive index profile and an annular pump core pump wavelength refractive index profile. The bridge optical fiber can optionally include one or more first claddings disposed between the inner core and the annular pump core, e.g., particularly when the active optical fiber is a thulium-doped optical fiber. The one or more first claddings have a first cladding active wavelength refractive index profile and a first cladding pump wavelength refractive index profile. The bridge optical fiber also includes one or more outer claddings disposed about the annular pump core. The one or more outer claddings have an outer cladding active wavelength refractive index profile and an outer cladding pump wavelength refractive index profile. In addition, one or more guided modes at the active wavelength are substantially confined in the inner core. The bridge optical fiber is configured (e.g., via its overall refractive index profile) such that less than 30% of the intensity distribution at the pump wavelength at the second end of the bridge optical fiber overlaps the inner core of the active optical fiber. The optical fiber amplifying system also includes an active optical fiber that has a first end substantially directly coupled to the output of the bridge optical fiber and a second end, the active optical fiber having an active core, a pump cladding surrounding the core, and one or more outer claddings surrounding the pump cladding. The active optical fiber is configured to amplify radiation of the first active wavelength when pumped with radiation of the pump wavelength. In certain embodiments, the one or more first claddings (when present), the inner core and the one or more outer claddings are configured to substantially confine a plurality of modes at the pump wavelength in the annular pump core. In certain embodiments, the one or more first claddings are present. In these systems, the bridge optical fiber can serve to provide pump radiation to the active optical fiber with a relatively low overlap with its active core, in order to spread out the heat generated by pump absorption along a longer length of the active optical fiber as described herein.

In another aspect, the disclosure provides an active bridge optical fiber. The active bridge optical fiber includes an inner core configured to guide radiation of the active wavelength. The inner core has an inner core active wavelength refractive index profile and an inner core pump wavelength refractive index profile. In this aspect of the disclosure, the inner core is an active core, i.e., configured to amplify radiation of the active wavelength when pumped with radiation of a pump wavelength, e.g., by including one or more rare earth ions (for example, thulium, ytterbium, neodymium, or erbium). The active bridge optical fiber also includes an annular pump core disposed about the inner core configured to guide radiation of the pump wavelength. The annular pump core has an annular pump core active wavelength refractive index profile and an annular pump core pump wavelength refractive index profile. The active bridge optical fiber can optionally include one or more first claddings disposed between the inner core and the annular pump core, e.g., particularly when the active bridge optical fiber is a thulium-doped optical fiber. The one or more first claddings have a first cladding active wavelength refractive index profile and a first cladding pump wavelength refractive index profile. The active bridge active optical fiber also includes one or more outer claddings disposed about the annular pump core. The one or more outer claddings have an outer cladding active wavelength refractive index profile and an outer cladding pump wavelength refractive index profile. In addition, one or more guided modes at the active wavelength are substantially confined in the inner core. The active bridge active optical fiber is configured (e.g., via its overall refractive index profile) such that less than 30% of the intensity distribution at the pump wavelength overlaps the inner core of the active bridge optical fiber. Such an active bridge optical fiber can be used as an active optical fiber in an amplifier system, i.e., by being optically coupled to a source of pump radiation; the relatively low degree of overlap between the annular pump core and the inner core will tend to spread the pump absorption and the resulting heat generation along a longer length of the fiber, thus increasing the damage power threshold. A separate passive bridge optical fiber can be to couple the pump radiation into the active bridge optical fiber.

In another aspect, the disclosure describes a method for providing amplified optical radiation having an active wavelength. The method includes providing an optical fiber amplifying system as described herein. The method also includes initiating the output radiation of the pump wavelength from the one or more first optical pump sources. The method further includes propagating radiation of the active wavelength into the optical fiber amplifying system using a seed optical source.

In another aspect, the disclosure provides a bridge optical fiber as described with respect to any of the systems or the methods described herein.

Any of the features described herein in conjunction with any one aspect or embodiment described herein can be combined with features described with respect to any other of the aspects or embodiments described herein (to the extent they are not mutually inconsistent) as would be evident to the person of ordinary skill in the art in view of the present disclosure.

The foregoing summary is illustrative only and is not intended to be in any way limiting. In addition to the illustrative aspects, embodiments, and features described above, further aspects, embodiments, and features will become apparent by reference to the figures and the following detailed description.

Figure 1:
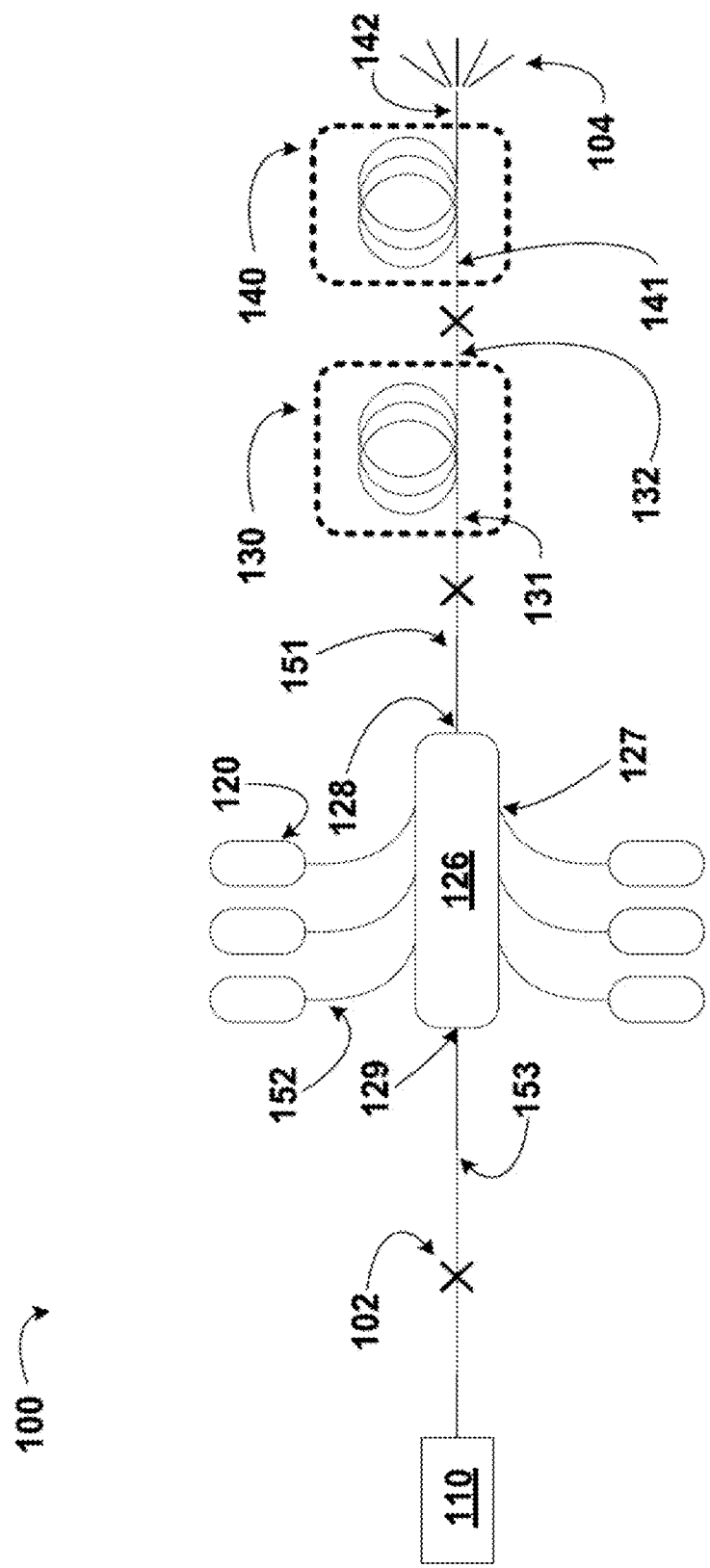
FIG. 1 is a partial schematic plan view of an optical fiber amplifying system, according to example embodiments.

As the person of skill in the art will appreciate, the drawings are not necessarily drawn to scale, and various elements of the system may, in certain drawings, be omitted for purposes of clarity.

DETAILED DESCRIPTION

Example methods and systems are described herein. Any example embodiment or feature described herein is not necessarily to be construed as preferred or advantageous over other embodiments or features. The example embodiments described herein are not intended to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

In the following discussion it is assumed that the reader has the basic knowledge of the structure of optical fibers familiar to the person of skill in the art. Thus, the concepts of a fiber core, cladding, and coatings are not discussed in detail. But, generally, an optical fiber includes a core surrounded by a cladding (both typically made of a glass material), which are surrounded by one or more polymer coatings (e.g., a softer primary coating and a harder secondary coating). As is familiar to the person of skill in the art, radiation having a wavelength propagates generally in the core of the fiber, the diameter of which is typically in the range of a few microns to a several hundred microns, even in some embodiments up to 1500 microns. The refractive index difference between the core and the cladding acts to confine the light in one or more propagating modes, generally in the core of the fiber (although the person of ordinary skill in the art will appreciate that some energy is actually present in the cladding in the region near the core).

The terms "light", "optical", and "radiation", as used herein, are used broadly as understood by one of ordinary skill in the art of optical waveguides, and are not to be limited as pertaining only to the visible range of wavelengths. Refractive indices described herein are described with reference to the wavelength of the radiation. In certain embodiments of the optical devices, systems, and methods described herein, the wavelength is in the visible or near-infrared (e.g., in the range of about 0.5 µm to about 3 µm).

I. OVERVIEW

The present inventors have noted that in the context of optical fiber amplifying systems, pump wavelength radiation propagating in the active optical fiber and overlapping with the active core region of the active optical fiber can be absorbed in the active optical fiber core to generate significant gain at the amplified wavelength over a relatively short distance at the pump input end of the active optical fiber. This absorption can generate, in addition to gain at the amplified wavelength, a considerable amount of heat at the input end to the active optical fiber. The amount of heat generated will be a function of, in part, the quantum inefficiency of the particular gain medium of the active core and the concentration of the particular gain medium in the active core, with gain media based on thulium generating especially high amounts of heat due to lower quantum inefficiencies and/or higher active ion concentrations. This heat must be dissipated, which can complicate system design and fabrication. Even further, the heat generated, if strong enough (e.g., when particularly high optical gains are sought), can lead to degradation or destruction of the active optical fiber or a splice at the pump input end of the active optical fiber, thereby leading to the optical fiber amplifying system being inoperative.

The present inventors have determined that in order to reduce the heat generated along any short length within the active optical fiber while still providing a desirable amount of gain within the active optical fiber, a bridge optical fiber can be disposed between the pump source and the active optical fiber, i.e., to couple pump radiation into the active optical fiber. The bridge optical fiber has a refractive index profile such that when the pump radiation is coupled from the bridge optical fiber to the active optical fiber, the intensity profile of the pump radiation has a relatively low overlap with the active core region of the active optical fiber. After being coupled from the bridge optical fiber into the active optical fiber, the pump radiation will maintain a relatively low overlap with the active core, for a non-negligible distance along the active optical fiber. This can lead to reduced heat generation, e.g., as a result of decreased pump absorption within the initial length of active optical fiber. But even if there is a lower initial overlap than in conventional systems, the overlap can still be sufficient such that a substantial amount of pump radiation is nonetheless absorbed by the active ions of the active optical fiber (albeit over a longer distance thereof). And in many embodiments the intensity profile of the pump radiation will, as it propagates along the active optical fiber, redistribute so that overlap between the pump radiation and the core of the active optical fiber increases. This has the net effect of flattening the pump absorption profile along the active optical fiber, which can allow for an increased amount of total pump absorption along the active optical fiber without any part of the fiber being heated to its damage threshold. Accordingly, an increased amount of pump absorption, and thus an increased amount of gain, can be provided over the total length of the active optical fiber, even though the overlap of the pump radiation with the active core region in the active optical fiber, at least initially, is less than may be common in optical fiber amplifiers.

Accordingly, one aspect of the disclosure describes an optical fiber amplifying system incorporating such a bridge optical fiber that is capable of providing an intensity profile of pump wavelength radiation having relatively lower overlap with the inner core of the active optical fiber. The optical amplifying system provides amplified optical radiation having an active wavelength and comprises: one or more first optical pump sources, each configured to output radiation of a pump wavelength; a bridge optical fiber, having an input configured to receive the radiation of the pump wavelength output by the one or more first optical pump sources and an output, the bridge optical fiber comprising: an inner core configured to guide radiation of the active wavelength, the inner core having an inner core active wavelength refractive index profile and an inner core pump wavelength refractive index profile; an annular pump core disposed about the inner core, the annular pump core being configured to guide radiation of the pump wavelength, the annular pump core having an annular pump core active wavelength refractive index profile and an annular pump core pump wavelength refractive index profile; optionally, one or more first claddings disposed between the inner core and the annular pump core, the one or more first claddings having a first cladding active wavelength refractive index profile and a first cladding pump wavelength refractive index profile; and one or more outer claddings disposed about the annular pump core, the one or more outer claddings having an outer cladding active wavelength refractive index profile and an outer cladding pump wavelength refractive index profile, the one or more outer claddings substantially confining radiation of the pump wavelength; wherein when present the one or more first claddings are configured to substantially confine one or more guided modes at the active wavelength in the inner core, the one or more first claddings when present are configured to, together with the one or more outer claddings, substantially confine a plurality of modes at the pump wavelength in the annular pump core; and wherein less than 30% of the intensity distribution at the pump wavelength at the second end of the bridge optical fiber overlaps the inner core of the active optical fiber; and an active optical fiber having a first end substantially directly coupled to the output of the bridge optical fiber and a second end, the active optical fiber having a core, a pump cladding surrounding the core, and one or more outer claddings surrounding the pump cladding, the active optical fiber being configured to amplify radiation of the first active wavelength when pumped with radiation of the pump wavelength.

II. EXAMPLE SYSTEMS

One example embodiment of such an optical fiber amplifying system is shown in the partial schematic view of FIG. 1. Optical amplifying system 100 is configured to provide amplified optical radiation having an active wavelength. The optical fiber amplifying system 100 includes one or more (here, six) first optical pump sources 120, each configured to output radiation of a pump wavelength, and a bridge optical fiber 130, having an input 131 configured to receive the radiation of the pump wavelength output by the one or more first pump optical sources 120, and an output 132. Optical amplifying system 100 further includes an active optical fiber 140 having a first end 141 substantially directly coupled to the output 132 of the bridge optical fiber (here, via a fusion splice), and a second end 142, the active optical fiber 140 being configured to amplify radiation of the first active wavelength when pumped with radiation of the pump wavelength.

Figure 2:
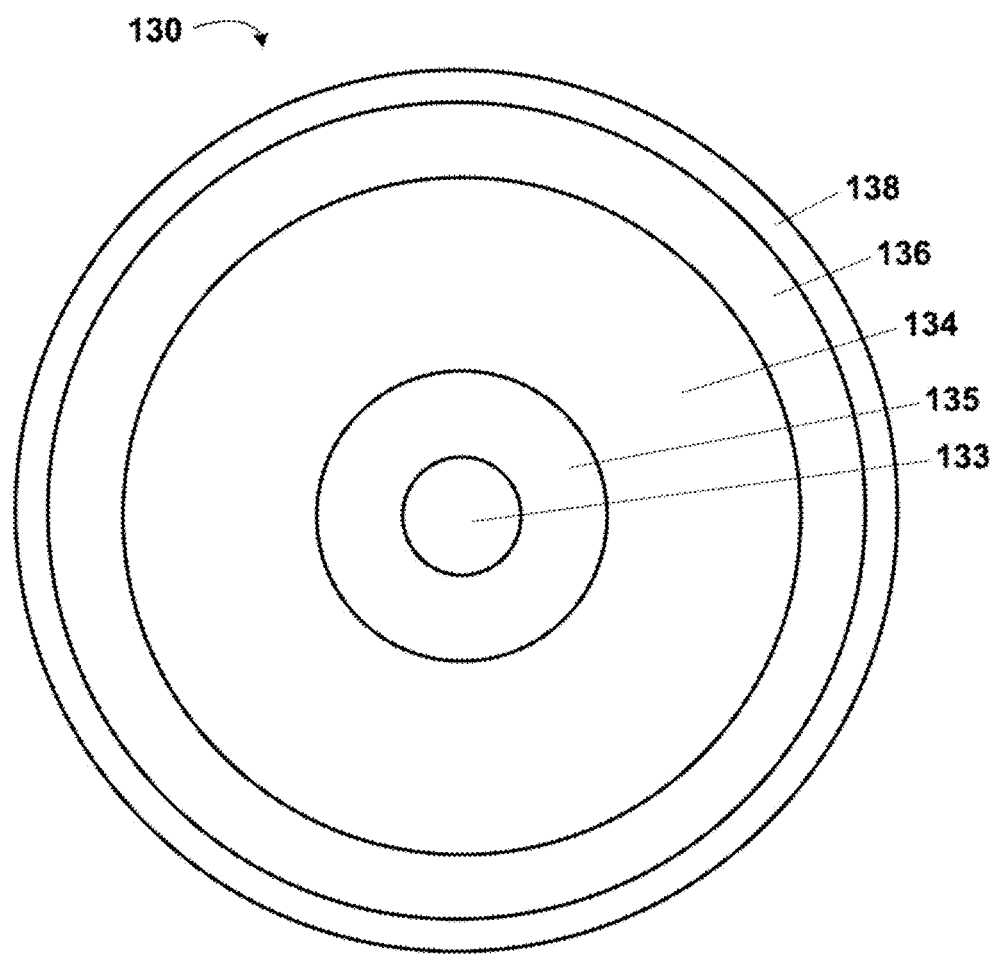
FIG. 2 is a schematic cross-sectional view of a bridge optical fiber, according to example embodiments.

A schematic cross-sectional view of the bridge optical fiber 130 of the system of FIG. 1 is shown in schematic view in FIG. 2. Bridge optical fiber 130 includes an inner core 133 configured to guide radiation of the active wavelength, the inner core 133 having an inner core active wavelength refractive index profile and an inner core pump wavelength refractive index profile each profile being for the refractive index of the core at the applicable wavelength), Disposed about the inner core 133 is an annular pump core 134 configured to guide radiation of the pump wavelength, the annular pump core 134 having an annular pump core active wavelength refractive index profile and an annular pump core pump wavelength refractive index profile. In this embodiment, disposed (annularly) between the inner core 133 and the annular pump core 134 are one or more (here, one) first claddings 135, the one or more first claddings 135 (together) having a first cladding active wavelength refractive index profile and a first cladding pump wavelength refractive index profile. Finally, disposed about the annular pump core 134 are one or more (here, one) outer claddings 136, the one or more outer claddings 136 (together) having an outer cladding active wavelength refractive index profile and an outer cladding pump wavelength refractive index profile. The one or more first claddings 135 are configured to substantially confine one or more guided modes at the active wavelength in the inner core 133, so that radiation of the active wavelength can be transmitted through the bridge optical fiber 130 in the inner core 133. The one or more first claddings 135 and the one or more outer claddings 136 are configured to substantially confine a plurality of guided modes at the pump wavelength in the annular pump core, so that pump radiation can be transmitted through the bridge optical fiber 130 substantially within the annular pump core 134. Less than 30% of the modal intensity at the pump wavelength overlaps the inner core 133, such that radiation of the pump wavelength can be provided at the output of bridge optical fiber 130 guided substantially in the annular pump core 134. As is conventional, the bridge optical fiber 130 has one or more polymeric coatings 138.

In certain embodiments, the system includes a pump coupler or combiner configured to couple the one or more pump sources to the input end of the bridge fiber. For example, as shown in FIG. 1, the system can include a pump coupler or combiner 126 having one or more pump input ports 127, each optically coupled to one of the one or more pump sources 120, and an output port 128 optically coupled to the input 131 of the bridge optical fiber 130. As the person of ordinary skill in the art will appreciate, a pump coupler or combiner can be made by fusion drawing a plurality of optical fibers (e.g., from each of the pump source(s) 120) together using techniques familiar to the person of ordinary skill in the art. The pump coupler or combiner 126 can be, for example, a multimode combiner. In certain embodiments, the combiner 126 can be a combiner as described in U.S. Pat. No. 7,991,255 and the references described therein, each of which is hereby incorporated herein by reference in its entirety.

In certain embodiments, the pump coupler or combiner 126 further includes a signal port, with the pump coupler 126 being configured to transmit radiation of the amplified wavelength between the signal port and the output port. For example, as shown in FIG. 1, pump coupler or combiner 126 includes a signal port 129, from which radiation of the amplified wavelength (e.g., from seed source 110, see below) can be transmitted to the output port 128. In other embodiments (e.g., in counter-pumped embodiments as described with respect to FIG. 3, below), radiation of the amplified wavelength (e.g., from the active optical fiber) is transmitted from the output port to the signal port.

All connections among the various system components can be made using various lengths of optical fiber (indicated generally in FIG. 1 with reference numerals 151 et seq.), as would be apparent to the person of ordinary skill in the art. For example, the length of fiber 151 that may connect the output 128 of the pump combiner 126 to the bridge optical fiber 130 may be a double-clad optical fiber. In some example embodiments, this double-clad optical fiber may have a large cladding region in which the pump radiation can be guided (e.g., 400 µm or larger) and also have a step-index design. This design may ensure guidance of the pump light within the cladding region. Such a fiber may also guide radiation from the seed optical source 110 through primarily a core region. Of course, in certain embodiments, no separate length of fiber is interposed between the output of the pump coupler or combiner and the input end of the bridge optical fiber; the bridge optical fiber can be fused directly to the output of the of the pump combiner.

The one or more first optical pump sources 120 are configured to output radiation of the first pump wavelength; as the person of ordinary skill in the art will appreciate, such pump radiation can be used as pump radiation to cause gain at the first amplified wavelength within the active optical fiber 140. The pump source(s) 120 may include frequency doublers or other mechanisms to achieve the desired wavelength output. The pump source(s) 120 may be connected to the coupler 126 using one or more lengths of fiber 152. These lengths of fiber 152 may be step-index pump fibers with very large cores (200 µm in diameter or more), for example. The pump source(s) 120 may, in some embodiments, be laser diodes. Depending on whether the seed optical source 110 is coupled into the bridge optical fiber 130 end or the active optical fiber 140 end of the optical fiber amplifying system 100, the pump source(s) 120 may pump the optical fiber amplifying system 100 in a co-pumping configuration (e.g., as in the optical fiber amplifying system 100 of FIG. 1) or a counter-pumping configuration (e.g., as in the optical fiber amplifying system 200 of FIG. 3).

Figure 28:
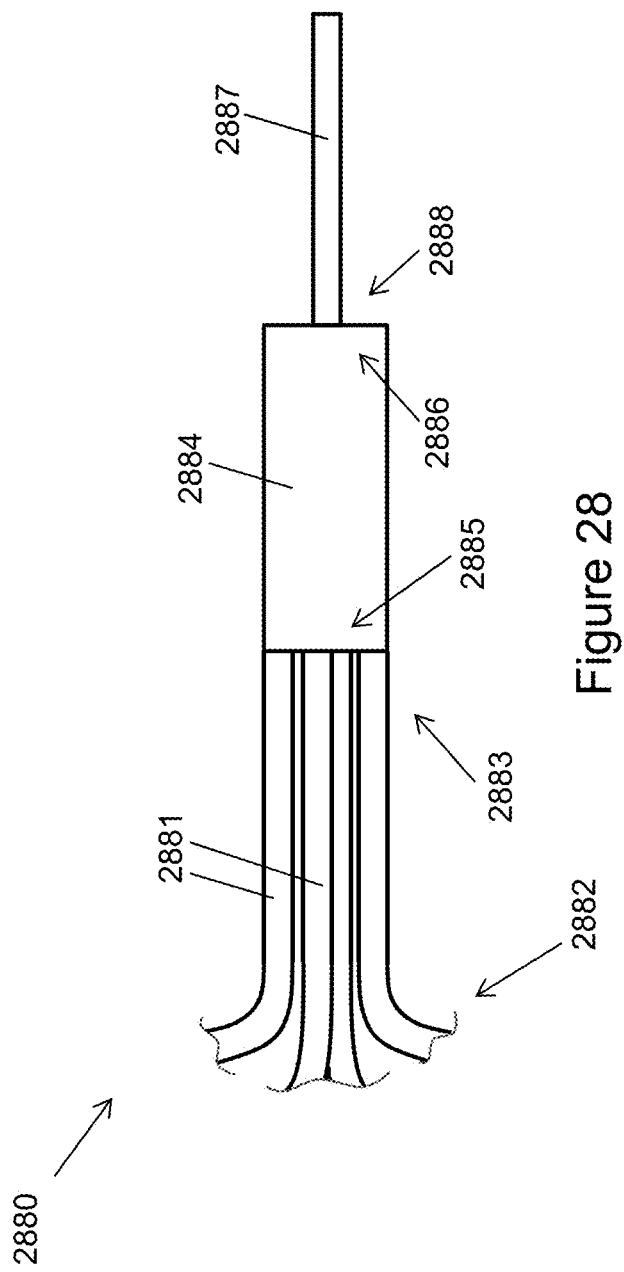
FIG. 28 is a schematic view of a pump coupler according to one embodiment of the disclosure
Figure 29:
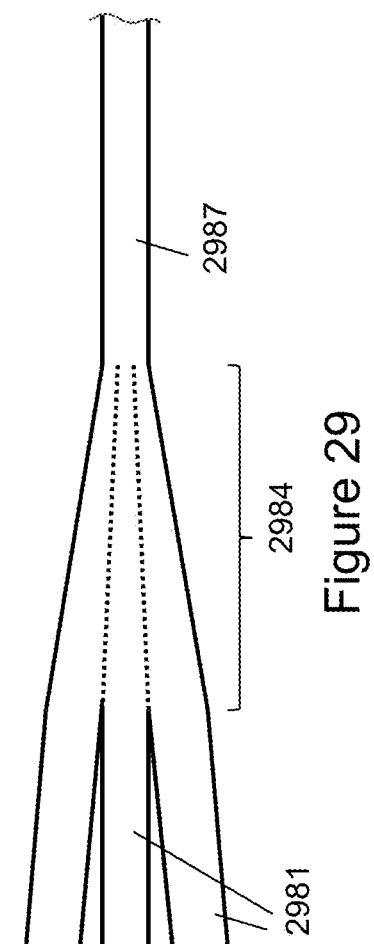
FIG. 29 is a schematic cross-sectional view of a pump coupler according to another embodiment of the disclosure.
Figure 30:
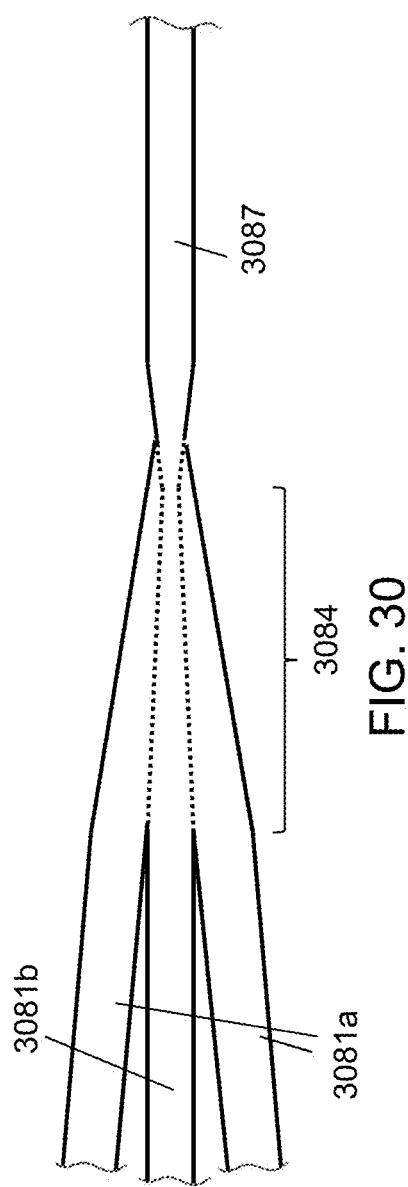
FIG. 30 is a schematic cross-sectional view of a pump coupler according to another embodiment of the disclosure.

In certain desirable embodiments, a bridge optical fiber is used in the construction of the pump coupler. Thus, another aspect of the disclosure is a pump coupler having as its output optical fiber a bridge fiber as described herein. The person of ordinary skill in the art will appreciate that many conventional coupler constructions can be used to provide such couplers. In one example, such a coupler includes one or more input optical fibers, each having an output; a coupling structure having an input and an output, the output of each of the one or more input optical fibers being coupled to (for example, by being attached to, e.g., by being fused to) the coupling structure; and a length of bridge optical fiber as described herein having an input coupled to the output of the coupling structure. The coupling structure is configured to substantially couple radiation guided by the one or more input optical fibers into the annular pump core the bridge optical fiber. An example of such a coupler is shown in schematic view in FIG. 28. In coupler 2880, a plurality of (here, four) input optical fibers 2881 have input ends 2882 and output ends 2883. Output ends 2883 of the input optical fibers 2881 are fused to the input 2885 of coupling structure 2884. Fused to the output 2886 of coupling structure is the input 2888 of a length of bridge optical fiber 2887. The coupling structure 2884 of FIG. 28 is shown only in schematic form; the person of ordinary skill in the art will appreciate that the coupling structure can take a number of actual physical form. For example, in certain embodiments, the coupling structure is in the form of a fused combination e.g., in the form of a fused taper) of the plurality of input optical fibers and the bridge optical fiber. This is a common architecture for optical fiber couplers, as would be appreciated by the person of ordinary skill in the art. One such architecture is shown in schematic view in FIG. 29, in which ends of pump optical fibers are fused together to form coupling structure 2984, with the input optical fibers 2981 fused to the input end thereof and the length of bridge optical fiber 2987 fused to the output end thereof. In the coupling structure 2984, the optical fibers are fused together; this is depicted by the dotted lines in FIG. 29, although in an actual coupler the transition between fibers may not be visible. In the example of FIG. 29, none of the input optical fibers is a bridge optical fiber. But in other embodiments, a bridge optical fiber can feed-through the coupler to allow a signal (e.g., a seed optical signal) to be fed into the bridge optical fiber at the output of the coupling structure. One such architecture is shown in schematic view in FIG. 30. Here, input fibers 3081a can be configured to guide pump radiation from a pump source, and input fiber 3081b is a length of bridge optical fiber as described herein. The bridge optical fiber is fused together with the other input fibers in the coupling structure 3084, then emerges from the coupling structure 3084 as a length of bridge optical fiber 3087.

Figure 31:
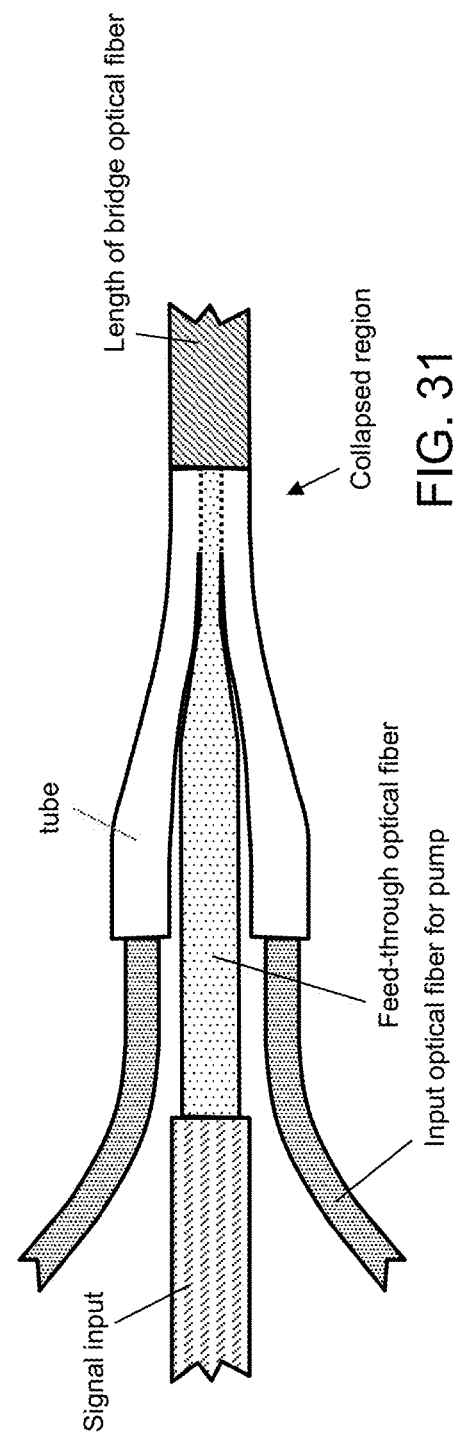
FIG. 31 is a schematic cross-sectional view of a pump coupler according to another embodiment of the disclosure.
Figure 32:
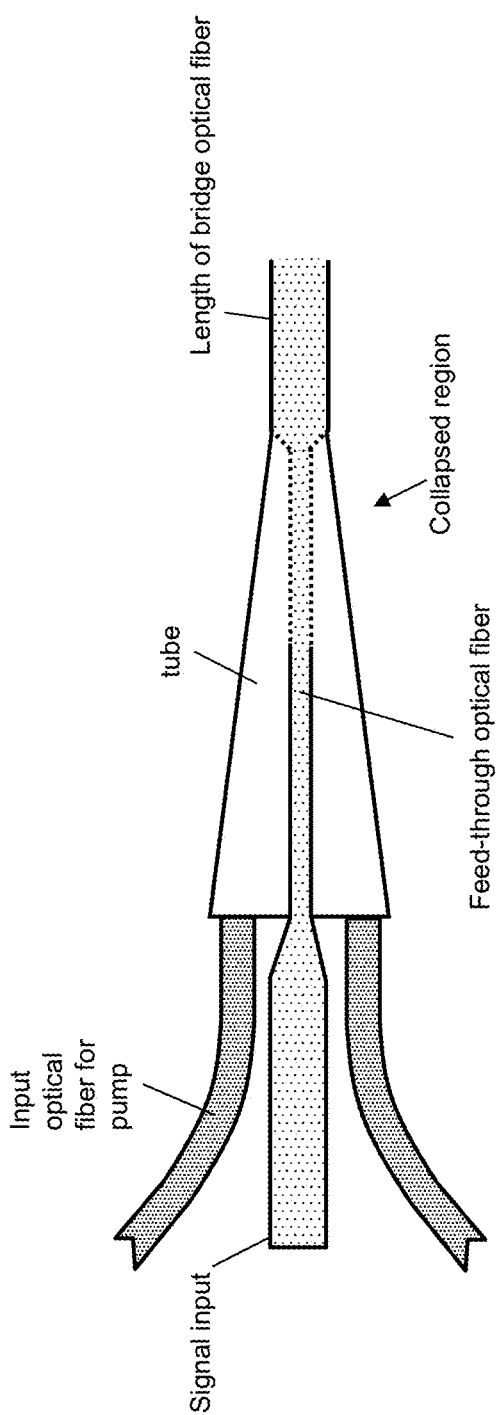
FIG. 32 is a schematic cross-sectional view of a pump coupler according to another embodiment of the disclosure.

In other embodiments, the coupling structure is formed from a separate glass structure, e.g., as described in U.S. Pat. No. 7,991,255. Which is hereby incorporated herein by reference in its entirety. In one such embodiment, the coupling structure includes a tube having a wide end, a narrow end, and a taper between; and a length of feed-through optical fiber disposed in the tube, with the tube being collapsed around the outer surface of the feed-through optical fiber. The length of bridge optical fiber at the output of the coupling can be a separate bridge optical fiber that is fused to a cleaved end of the coupler structure as described in U.S. Pat. No. 7,991,255 and as shown in FIG. 31, or can be formed from the bridge optical fiber that feeds entirely through the tube, as shown in FIG. 32. In either case, input optical fibers for pump radiation can be fused to the wide end of the tube, and, optionally, an input signal fiber (e.g., a length of bridge optical fiber as shown in FIG. 32, or a separate optical fiber) can enter the tube at the input end thereof to be coupled to the length of feed-through optical fiber around which the tube is collapsed. The length of feed-through fiber around which the tube is collapsed can have a reduced diameter, e.g., as compared to a length of bridge optical fiber at the input end of the coupling structure and/or a length of bridge optical fiber emerging from the output end of the coupling structure. Couplers according to these embodiments can otherwise be fabricated as described in U.S. Pat. No. 7,991,255.

Figure 3:
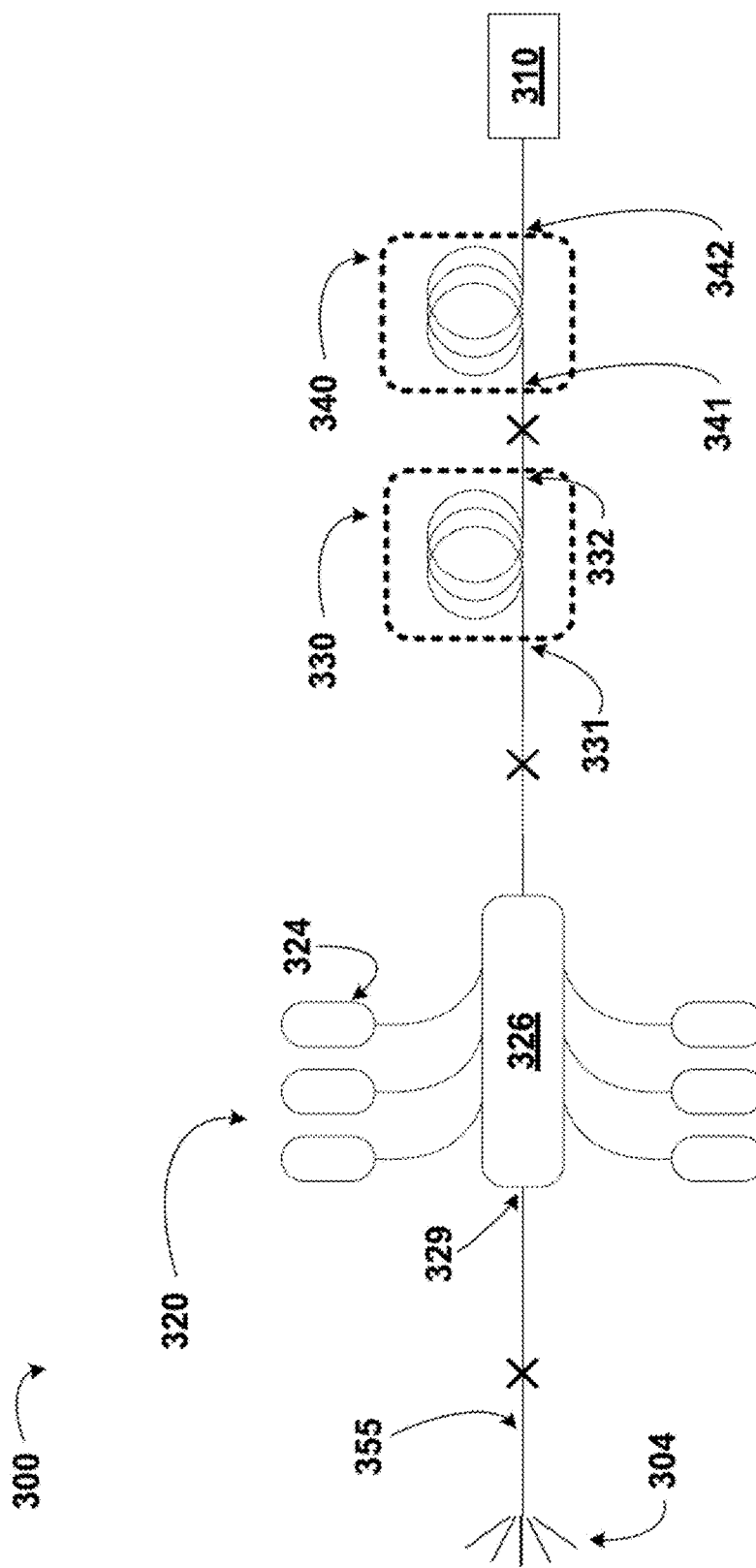
FIG. 3 is a partial schematic plan view of an optical fiber amplifying system according to example embodiments.

In certain embodiments the system includes a seed optical source configured to provide radiation of the first amplified wavelength to the active optical fiber. For example, the optical amplifying system 100 of FIG. 1 includes seed optical source 110, which is optically coupled (through the pump coupler or combiner 126, see below, and through the bridge optical fiber 130) to the first end 141 of the active optical fiber. As the person of ordinary skill in the art will appreciate, the seed optical source 110 provides radiation of the amplified wavelength to be amplified within the active optical fiber. Typically, the amplified wavelength will be longer than the pump wavelength; the person of ordinary skill in the art will be able to determine applicable amplified wavelengths and pump wavelengths for a particular gain medium of an active optical fiber, and the person of ordinary skill in the art will further appreciate that in reality the amplified radiation will be of a band of wavelengths around the nominal "amplified wavelength". Of course, as the person of ordinary skill in the art will appreciate, in some embodiments no seed optical source is necessary; in such embodiments, spontaneous emission at the amplified wavelength can be amplified within the active optical fiber to provide the amplified radiation. A reflective element (e.g., a Bragg grating), for example, positioned where the seed optical sources are shown in FIGS. 1 and 3, or between the pump source(s) and the bridge optical fiber, or even within the bridge optical fiber itself, can reflect spontaneous amplified radiation to the output.

In some embodiments, such as the optical fiber amplifying system 100 of FIG. 1, the seed optical source 110 may be coupled to the input of the pump combiner 120. In alternate embodiments, the seed optical source 110 may instead be coupled into the optical fiber amplifying system 100 between the pump combiner 126 and the bridge optical fiber 130. In still further embodiments, such as the embodiment of FIG. 3, the seed optical source 110 may be optically coupled to the second end of the active optical fiber 340, and allow the optical fiber amplifying system 300 to amplify radiation in a counter-pumped configuration (see FIG. 3).

The coupling of the seed optical source 110 to the optical fiber amplifying system 100, depending on embodiment, may be done in various manners, as would be apparent to the person of ordinary skill in the art. One method involves coupling using free-space optics. Alternatively, the seed optical source can be fiber-coupled to the rest of the system, as shown in FIG. 1 for example. The seed optical source 110 can be provided in a number of different forms, depending on the specific embodiments. Some example seed optical sources 110 include solid state lasers (e.g., diode lasers), gas lasers, and oscillators.

Here, too, a length of fiber can be used to couple the seed optical source to the rest of the system. For example, in the embodiment of FIG. 1, optical fiber 153 connects the seed optical source 110 to the signal port of the pump coupler or combiner 126.

The output 104 is the section of the optical fiber amplifying system 100 that outputs amplified radiation. In some embodiments, the output 104 of the optical fiber amplifying system can be coupled to another optical fiber (e.g., a beam delivery fiber) via conventional coupling methods such as fusion splicing. In other embodiments, the output 104 will launch a free-space propagating beam.

As noted above, various lengths of fiber can be used to interconnect the various system components; the person of ordinary skill in the art will appreciate that additional interconnection fibers can be used beyond those specifically mentioned herein (although there is substantially no interconnection fiber between the bridge optical fiber and the active optical fiber). Fusion splices can also be used to interconnect various optical fibers. Such fusion splices are denoted by "X" marks along the fiber path in the schematic views of FIGS. 1 and 3. Specifically, a fusion splice can directly interconnect the output end of the bridge optical fiber 130 to the first end of the active optical fiber 140. The person of ordinary skill in the art will make such fusion splices in such a way as to achieve maximum transmission and minimum reflection for optical radiation being transmitted from one section of the system 100 to the nexte. While fusion splices can be made with high efficiency, they nonetheless represent a point of weakness of the overall system. In certain embodiments, the active optical fiber has substantially the same outer diameter as the bridge optical fiber, exclusive of any polymeric coatings.

In FIG. 1, the optical fiber amplifying system 100 is in a co-pumping configuration (the seed optical source 110 and the pump source(s) 124 being on the same side of the active optical fiber 140). The person of ordinary skill in the art will appreciate that an optical fiber amplifying system according to the present disclosure can also be made in a counter-pumping configuration; such an embodiment is shown in schematic plan view in FIG. 3. Optical amplifying system 300 of FIG. 3 is in a counter-pumping configuration (with the seed optical source 310 and the pump source(s) 324 being on opposite sides of the active optical fiber 340). In optical amplifying system 300, as in the system of FIG. 1, the pump source(s) 324 are coupled through the pump coupler or combiner 326 to the input end 331 of bridge optical fiber 330. And similarly to the situation in FIG. 1, the output end 332 of bridge optical fiber 330 is substantially directly coupled to the first end 341 of the active optical fiber 340. But here, the seed optical source 310 is optically coupled to the second end 342 of the active optical fiber. In this embodiment, the pump coupler or combiner 326 includes a signal port; here, optical fiber 355 is coupled to the signal port 329 to provide an output 304. Thus, the direction of the output of the amplified signal is opposite that of the direction of the output of the amplified signal in the optical fiber amplifying system 100 of FIG. 1.

Of course, the person of ordinary skill in the art will appreciate that systems can similarly be configured in a co-counter-pumping configuration (i.e., when the active optical fiber is pumped from both ends). In such cases, the one or more first pump sources and the first bridge optical fiber can be configured in a co-pumping configuration, and a second bridge optical fiber can be disposed at the second end of the active optical fiber and be configured to receive radiation of the pump wavelength output by one or more second optical pump sources; the second end of the active optical fiber can be substantially directly coupled to the output of the second bridge optical fiber. The second bridge optical fiber and the one or more second pump sources can be configured with respect to the second end of the active optical fiber, for example, substantially as described above as for the bridge optical fiber and the one or more first pump sources with respect to the first end of the active optical fiber in a counter-pumping configuration.

The bridge optical fiber is an important element of the optical fiber amplifying systems described herein. The bridge optical fiber is a passive element of the optical fiber amplifying system 100 configured to transmit pump radiation to the first end of the active optical fiber while shaping the pump radiation so that it has a much higher degree of spatial overlap with the pump cladding of the active optical fiber than with the core region of the active optical fiber. When the pump radiation is shaped in such a way, upon entering the active optical fiber, there will be less immediate overlap of the pump radiation with the active core of the active optical fiber. Therefore, less immediate gain will occur in the first segment of the active optical fiber, thereby leading to less heat generation in this first segment. However, as the pump radiation is transmitted along the active optical fiber, it will sufficiently overlap with the active core to be absorbed and provide gain at the amplified wavelength. Provided the active optical fiber has adequate length, it can still sufficiently amplify radiation at the amplified wavelength—there is just relatively less amplification (and thus less heat generation) in the immediate area of the first end, with the amplification being somewhat more evenly spread along the fiber. This can allow for a higher degree of power scaling before reaching the damage threshold of the system in the neighborhood of the first end of the active optical fiber.

Figure 4:
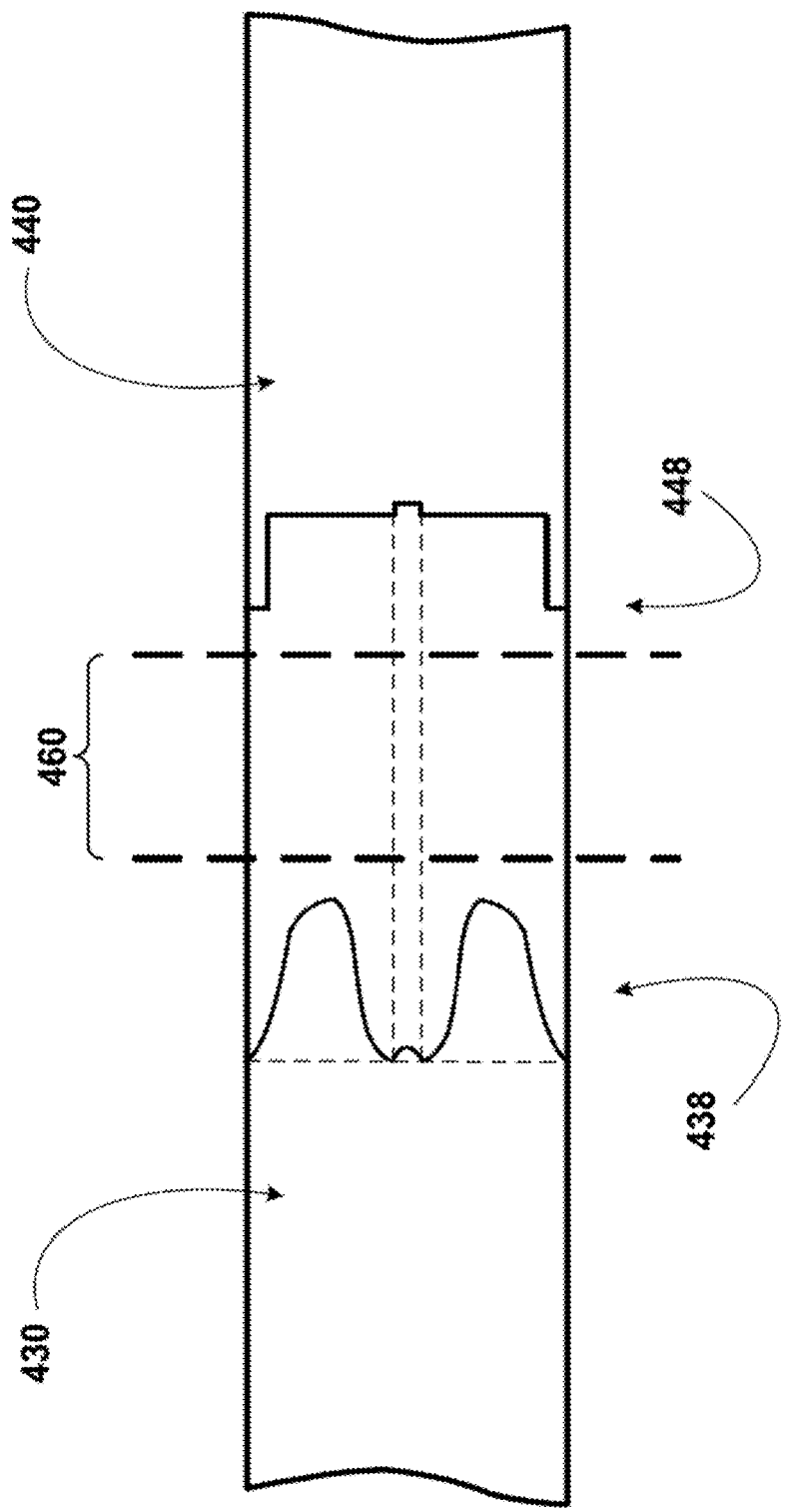
FIG. 4 is a partial schematic side view of a connection between two optical fibers, according to example embodiments.

In certain desirable embodiments, the overlap between the distribution of the intensity at the pump wavelength carried by the bridge optical fiber at its second end and the active core of the active optical fiber is no more than about 30% (e.g., no more than about 20%, no more than about 10%, or even no more than about 5%). That is, when overlaid with one another, overlapping as in the system, no more than 30% (e.g., no more than 20%, no more than 10%, no more than about 5%) of the intensity distribution of the pump wavelength at the second end of the bridge optical fiber overlaps with the active core of the active optical fiber. This relationship is depicted in FIG. 4. FIG. 4 is a partial schematic view of an optical amplifying system in the neighborhood of the interconnection of a bridge optical fiber 430 and an active optical fiber 440. In the embodiment of FIG. 4, the bridge optical fiber 430 is spliced to the active optical fiber 440; a splice region (in which the materials of the optical fibers are fused together and transition into one another) is indicated by reference numeral 460. The distribution of intensity at the pump wavelength carried by the bridge optical fiber at its second end just outside of the splice region) is indicated by reference numeral 438, while the refractive index distribution (at the amplified wavelength) is indicated by reference numeral 448. In the embodiment of FIG. 4, the bridge optical fiber 430 has shaped the radiation of the pump wavelength such that upon entering the active optical fiber 440, the radiation of the pump wavelength will primarily overlap with the pump cladding of the active optical fiber 440, with relatively little (e.g., no more than 30%, no more than 20%, no more than about 10%, or no more than about 5%) of the intensity overlapping the core region of the active optical fiber 440.

Figure 5:
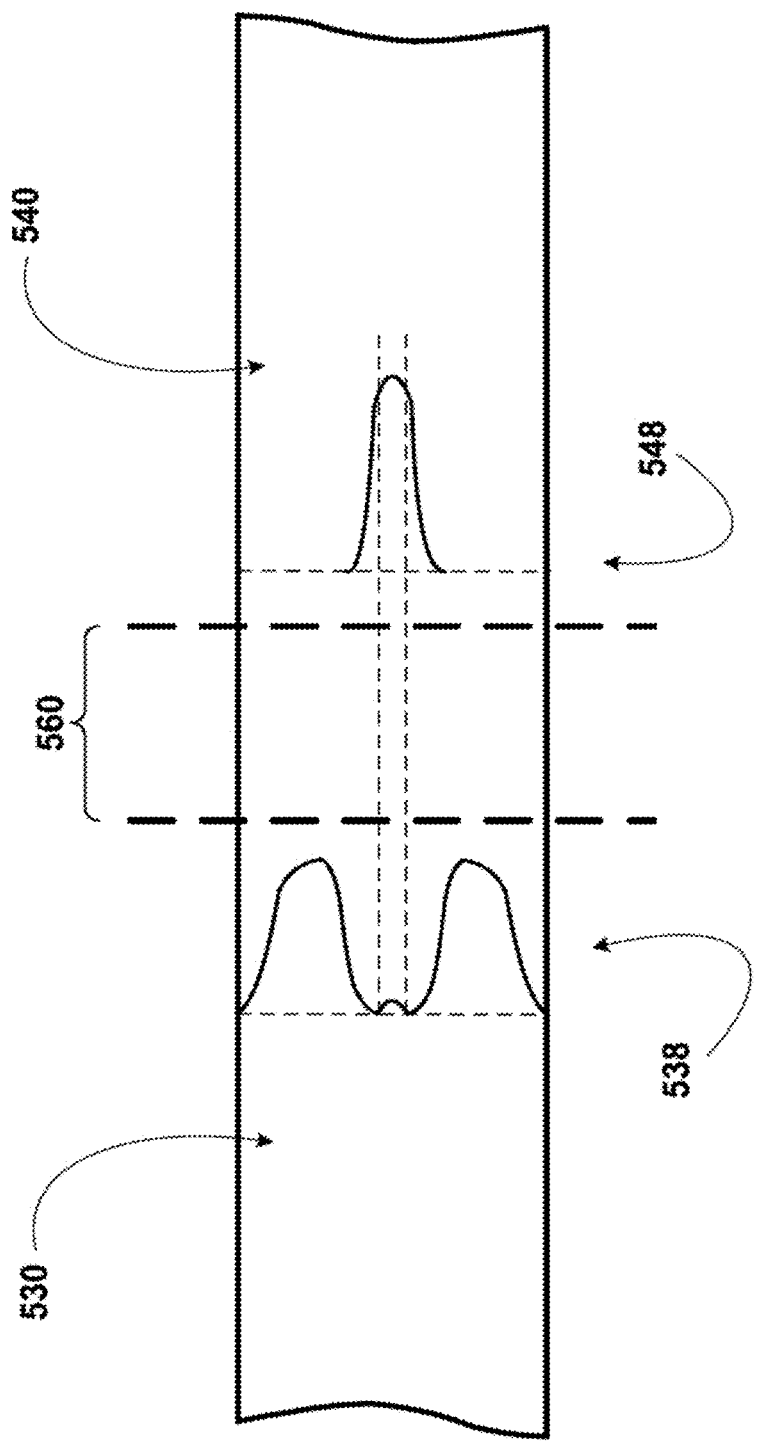
FIG. 5 is a partial schematic side view of a connection between two optical fibers, according to example embodiments.

In certain embodiments (e.g., when there is a seed source present and coupled to the input end of the bridge optical fiber), the overlap between the intensity distribution at the pump wavelength at the second end of the bridge optical fiber (i.e., just outside of the splice region) and the intensity distribution at the active wavelength at the first end of the active optical fiber (i.e., just outside of the splice region) is no more than about 30% (e.g., no more than about 20%, no more than about 10%, or even no more than about 5%). This relationship is depicted in FIG. 5. FIG. 5 is a partial schematic view of an optical amplifying system in the neighborhood of the interconnection of a bridge optical fiber 530 and an active optical fiber 540. In the embodiment of FIG. 5, the bridge optical fiber 530 is spliced to the active optical fiber 540; a splice region (in which the materials of the optical fibers are fused together and transition into one another) is indicated by reference numeral 560. The distribution of intensity at the pump wavelength carried by the bridge optical fiber at its second end (i.e., just outside of the splice region) is indicated by reference numeral 538, while the intensity distribution at the active wavelength at the first end of the active optical fiber (i.e., just outside of the splice region) is indicated by reference numeral 548. In the embodiment of FIG. 5, the bridge optical fiber 530 has shaped the radiation of the pump wavelength such that upon entering the active optical fiber 540, the radiation of the pump wavelength will primarily overlap with the pump cladding of the active optical fiber 540, with relatively little (e.g., no more than 30%, no more than 20%, no more than about 10%, or no more than about 5%) of the intensity overlapping the intensity distribution at the active wavelength at the first end of the active optical fiber.

Figure 6:
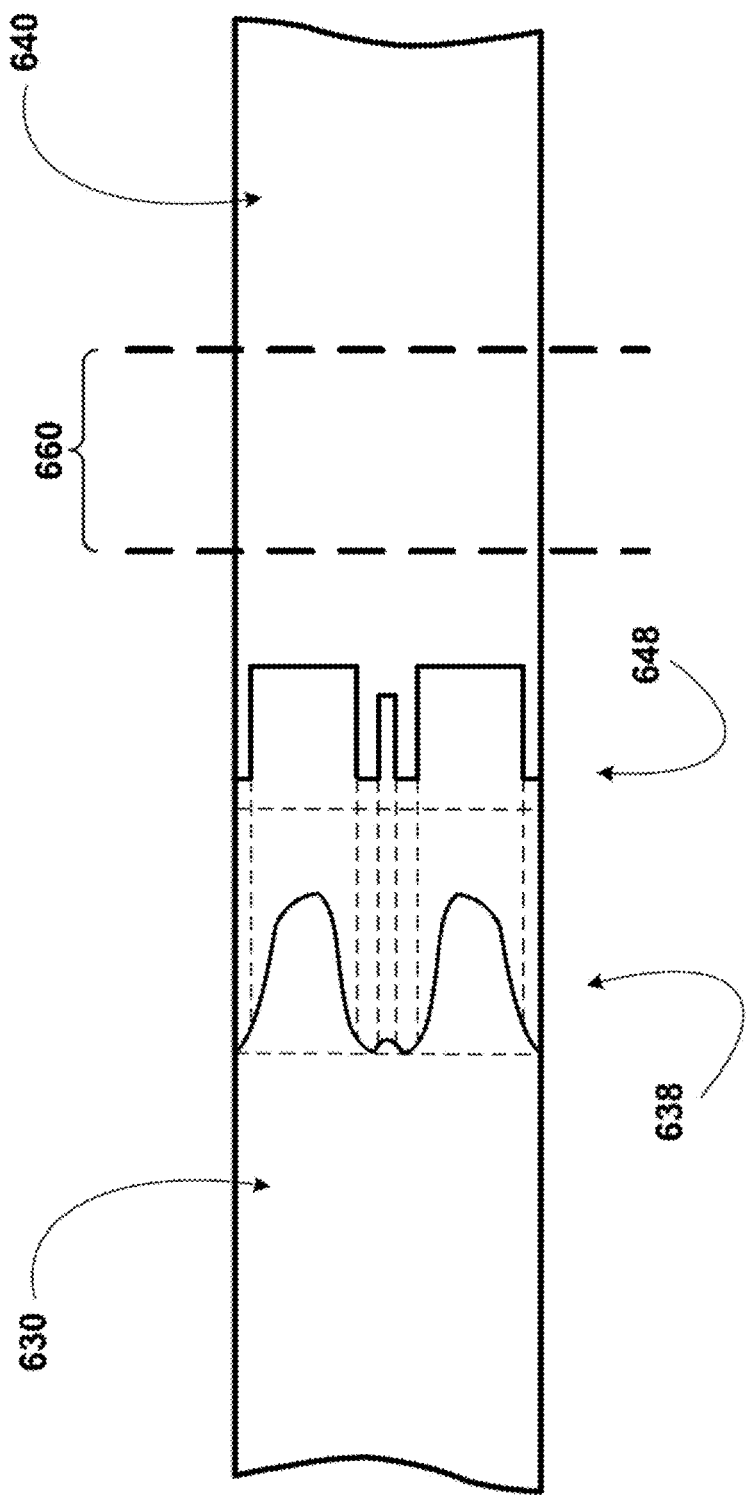
FIG. 6 is a partial schematic side view of a connection between two optical fibers, according to example embodiments.

In certain embodiments (e.g., when there is a seed source present), the overlap between the intensity distribution at the pump wavelength at the second end of the bridge optical fiber (i.e., just outside of the splice region) and the intensity distribution at the active wavelength at the second end of the bridge optical fiber (i.e., just outside of the splice region) is no more than about 30% (e.g., no more than about 20%, no more than about 10%, or even no more than about 5%). This relationship is depicted in FIG. 6. FIG. 6 is a partial schematic view of an optical amplifying system in the neighborhood of the interconnection of a bridge optical fiber 630 and an active optical fiber 640, In the embodiment of FIG. 6, the bridge optical fiber 630 is spliced to the active optical fiber 640; a splice region (in which the materials of the optical fibers are fused together and transition into one another) is indicated by reference numeral 660. The distribution of intensity at the pump wavelength carried by the bridge optical fiber at its second end (i.e., just outside of the splice region) is indicated by reference numeral 638, while the refractive index distribution (at the amplified wavelength) is indicated by reference numeral 639. In the embodiment of FIG. 6, the bridge optical fiber 630 has shaped the radiation of the pump wavelength (carried substantially in the annular core) such it has relatively little overlap with the radiation of the active wavelength (carried substantially in the inner core). When the inner core of the bridge optical fiber is centered with respect to the active core of the active optical fiber, the radiation of the pump wavelength entering the active optical fiber 640 will primarily overlap with the pump cladding of the active optical fiber, with relatively little of the intensity overlapping the intensity distribution at the active wavelength at the first end of the active optical fiber.

As described above, reducing the overlap between the pump radiation and the amplification in the active core of the active optical fiber can help to spread the gain in the active optical fiber over a longer length thereof, thus helping to reduce the heat generation in the initial segment of the active optical fiber. Each of the embodiments of the three paragraphs described above (e.g., the superposition of the distributions indicated by references numerals 538 and 548, which represent the two intensity distributions at the first end of the active optical fiber), demonstrates this effect. Because the majority of the pump wavelength radiation is concentrated in the pump cladding, rather than in the active core region, of the active optical fiber, the amount of gain in the initial segment of the active optical fiber is reduced, and thus the amount of heat generated in the initial segment of the active optical fiber due to the quantum defect is reduced.

The bridge optical fiber is desirably long enough such that radiation provided from the one or more pump optical sources at the input end thereof is provided with the desired intensity profile (i.e., as otherwise described herein) at the second end thereof. For example, in certain embodiments, the optical path length of the bridge optical fiber (i.e., from its input end to its output end) is at least about 10 cm, at least about 20 cm, at least about 50 cm, or at least about 1 m. For example, in certain embodiments, the optical path length of the bridge optical fiber is in the range of 10 cm-10 m, 20 cm-10 m, 50 cm-10 m, 1 m-10 m, 10 cm-5 m, 20 cm-5 m, 50 cm-5 m, or 1 m-5 m.

Figure 7:
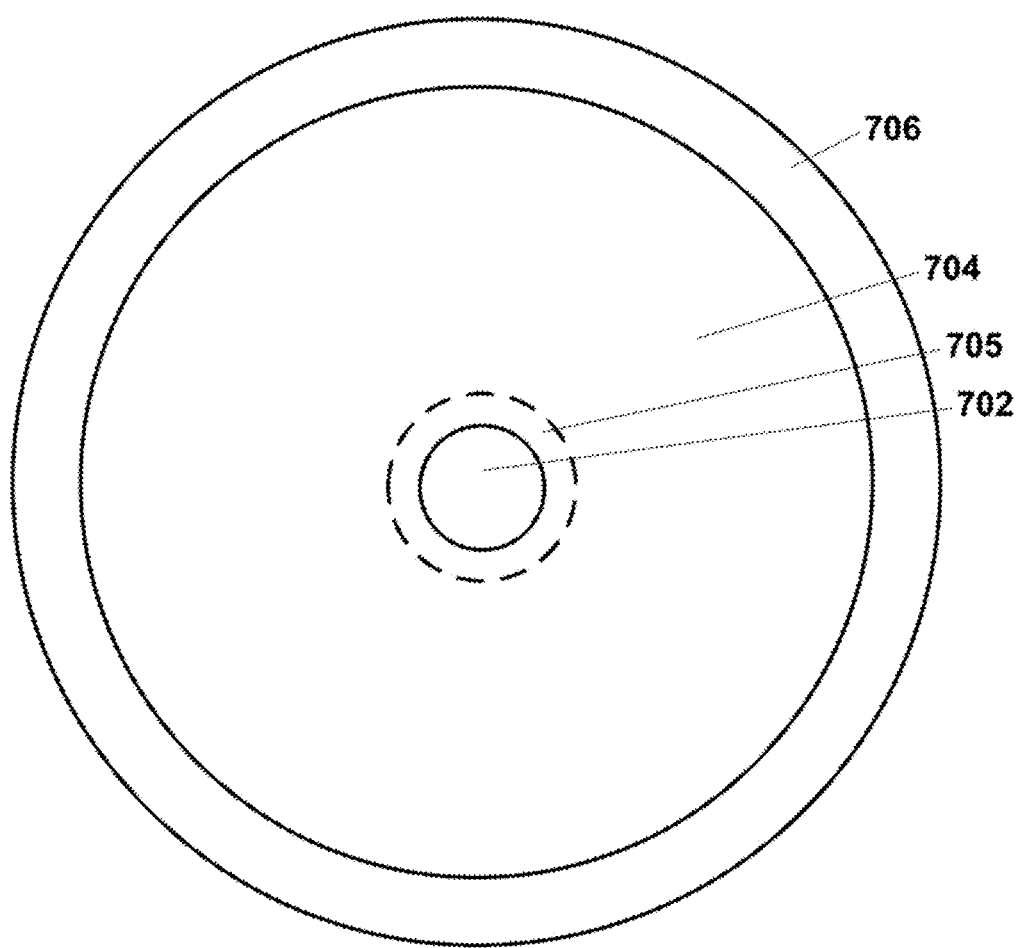
FIG. 7 is a schematic cross-sectional view of an optical fiber, according to example embodiments.
Figure 8:
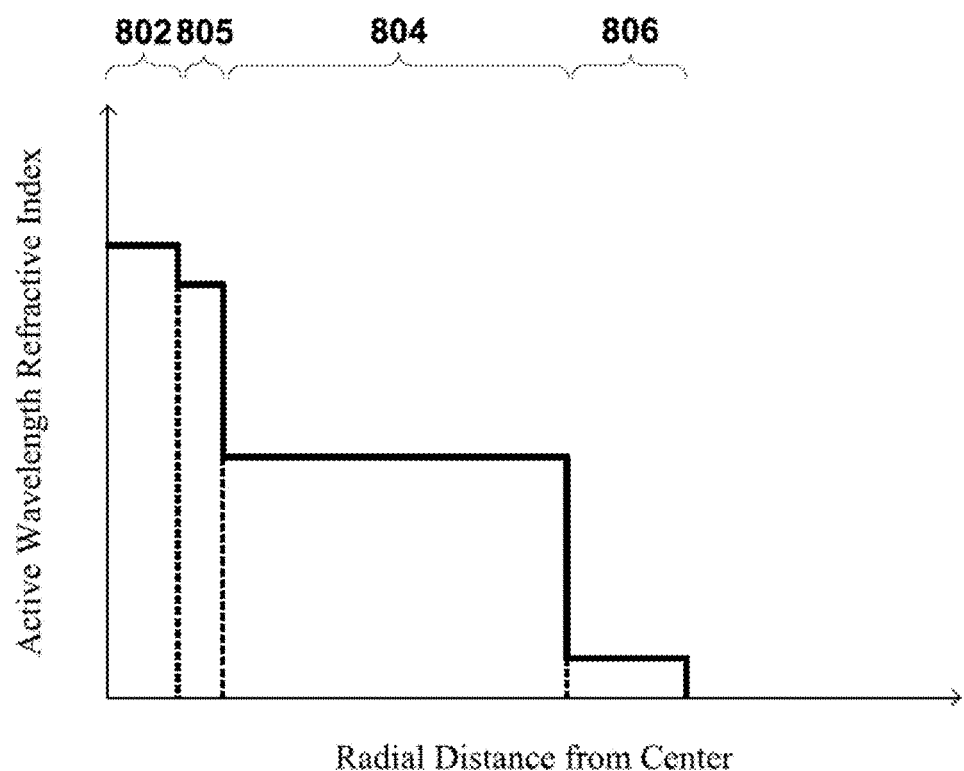
FIG. 8 is a graphical depiction of a refractive index profile of an optical fiber, according to example embodiments.

As the person of ordinary skill in the art will appreciate, the active optical fiber is the section of the optical fiber amplifying system in which the actual amplification at the active wavelength (e.g., of radiation emitted from a seed optical source, or of spontaneous emission) is carried out. As described above, the active optical fiber has an active core, a pump cladding surrounding the active core (i.e., configured to guide radiation of the first amplified wavelength within the active core), and one or more outer claddings surrounding the pump cladding (i.e., configured to guide radiation of a pump wavelength within the pump cladding and the active core). Accordingly, the person of ordinary skill in the art will appreciate that the active optical fiber is a double-clad optical fiber; conventional double-clad active optical fibers can be used in the practice of the methods and systems described herein. This configuration is shown in cross-sectional view in FIG. 7 (the active core indicated by reference number 702, the pump cladding indicated by reference number 704, and the outer cladding indicated by reference numeral 706). The pump cladding 704 layer within the double-clad optical fiber can be circular in cross-section, or, in other embodiments, be substantially non-circular in cross-section (e.g., polygonal such as hexagonal, octagonal, triangular, or square, oval, or elliptical). The active core 702 of the active optical fiber desirably contains rare earth dopants, such as neodymium, ytterbium, erbium, thulium, praseodymium, holmium, or some combination thereof. In certain particularly advantageous embodiments, the rare earth dopant is thulium. In other embodiments, the rare earth dopant is ytterbium. Further, as is familiar to the person of ordinary skill in the art, the pump cladding 704 may include a pedestal region 705 immediately surrounding the active core 702, the pedestal region 705 having an active wavelength refractive index only slightly below that of the active core 702 and configured to provide single-mode guidance of radiation of the active wavelength within the active core 702. An example of a refractive index profile (i.e., at the active wavelength) of the active optical fiber is shown in FIG. 8; the active core is denoted by reference numeral 802, the pump cladding is denoted by reference numeral 804, the pedestal region of the pump cladding is denoted by reference numeral 805, and the outer cladding is denoted by reference numeral 806.

One embodiment of a bridge optical fiber is described above with respect to the cross-sectional view of FIG. 2. The person of ordinary skill in the art will, based on the description herein, design and fabricate bridge optical fibers suitable for use in the presently described systems and methods. As described above with respect to FIG. 2, the bridge optical fiber has an inner core 133, an annular pump core 134 disposed about the inner core, one or more first claddings 135 disposed between the inner core and the annular pump core, and one or more outer claddings 136 disposed about the annular pump core. Certain designs of bridge optical fibers suitable for use in the presently-described methods and systems are discussed in more detail below with respect to FIGS. 9-13. In certain embodiments, the bridge optical fiber may have a substantially circular cross-sectional shape, in order to provide for ease of splicing to an active optical fiber. The person of ordinary skill in the art will appreciate that the length of the bridge optical fiber may vary; it is desirably long enough such that the pump radiation transmitted from its input end to its output end is provided at the output end with the desired radial intensity distribution as described herein. The length of the bridge optical fiber, for example, can be in the range of from 1 centimeter up to 10 meters.

Figure 9:
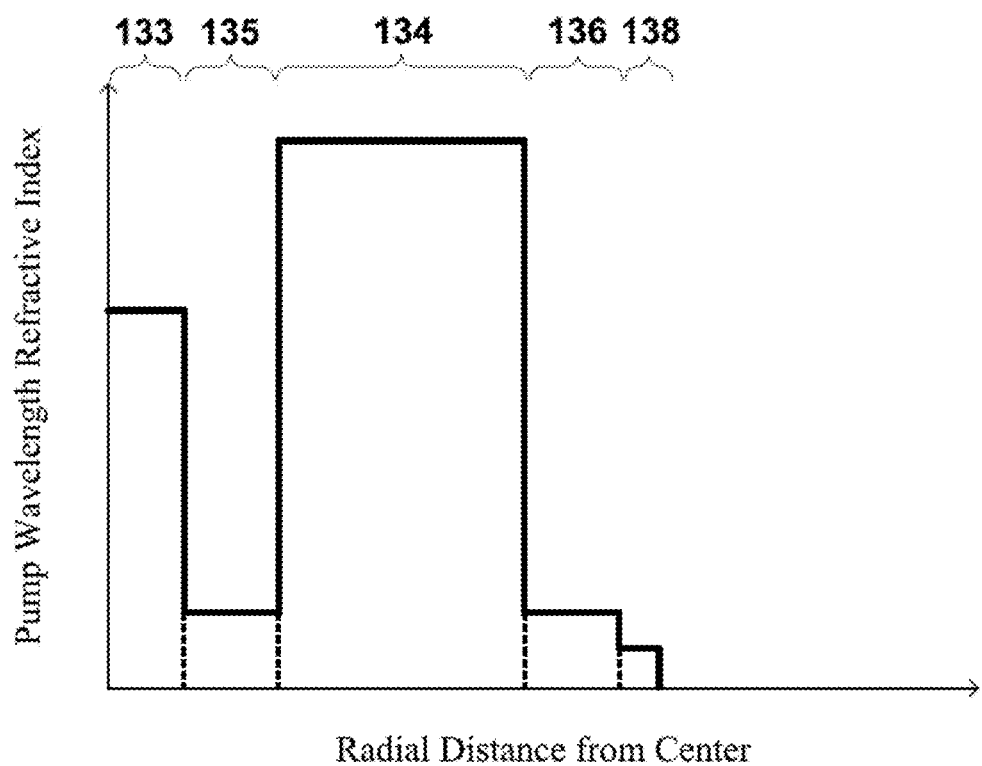
FIG. 9 is a graphical depiction of a refractive index profile of an optical fiber, according to example embodiments.

FIG. 9 is a view of an example of a refractive index profile for the bridge optical fiber of FIG. 2. In the graph of FIG. 9, the refractive indices are at the pump wavelength, but the active wavelength refractive indices have substantially the same interrelationships. The inner core 133 is at the center of the bridge optical fiber, and is immediately surrounded by a first cladding 135, which in turn is immediately surrounded by an annular pump core 134, which is immediately surrounded by an outer cladding 136. As the person of ordinary skill in the art will appreciate, one or more of the outer claddings can be, for example, surrounded by a polymeric material that can serve to protect the optical fiber from physical damage during handling.

In certain embodiments, e.g., as shown in FIG. 9, the peak refractive index of the active core is less than the peak refractive index of the first annular core at the pump wavelength, or even at both the pump wavelength and the active wavelength. The refractive index of the one or more first cladding layers is less than the refractive index of the active core at the active wavelength, so as to guide radiation of the active wavelength (e.g., from a seed laser) within the inner core. And the refractive index of the one or more first cladding layers and the one or more outer cladding layers is substantially less than that of the annular pump core, so as to guide the pump radiation in the annular pump core. In certain desirable embodiments, the modal intensity overlap of the highest order guided mode of the inner core for the active wavelength with the highest order guided mode of the annular core for is no more than 30%, no more than 25%, no more than 20%, no more than 15%, no more than 10%, no more than 5%, or even no more than 1% in various embodiments.

As described above, the inner core of the bridge optical fiber (133 in FIG. 2) is configured to guide radiation of the amplified wavelength. Depending on whether the optical fiber amplifying system is operating in a co-pumping or counter-pumping configuration, the radiation to be guided in the inner core of the bridge optical fiber will either be just about to enter the active optical fiber (co-pumping, in cases with a seed optical source), or will have just left the active optical fiber (counter-pumping). In certain desirable embodiments of the systems and methods described herein, the inner core is substantially centered in the cross-section of the bridge optical fiber. Similarly, in certain desirable embodiments, the inner core has a substantially circular cross-sectional shape (e.g., to avoid polarization of the radiation being transmitted therethrough). Of course, the person of ordinary skill in the art will appreciate that polarization of the radiation of the amplified wavelength can be provided by using conventional methods and structures such as the addition of birefringent elements or a non-circularly symmetric core. In certain embodiments (e.g., as described above with respect to FIG. 9), the inner core has a substantially constant refractive index (i.e., a step-index optical fiber). But in other embodiments, the inner core has a graded or otherwise varying refractive index.

Figure 10:
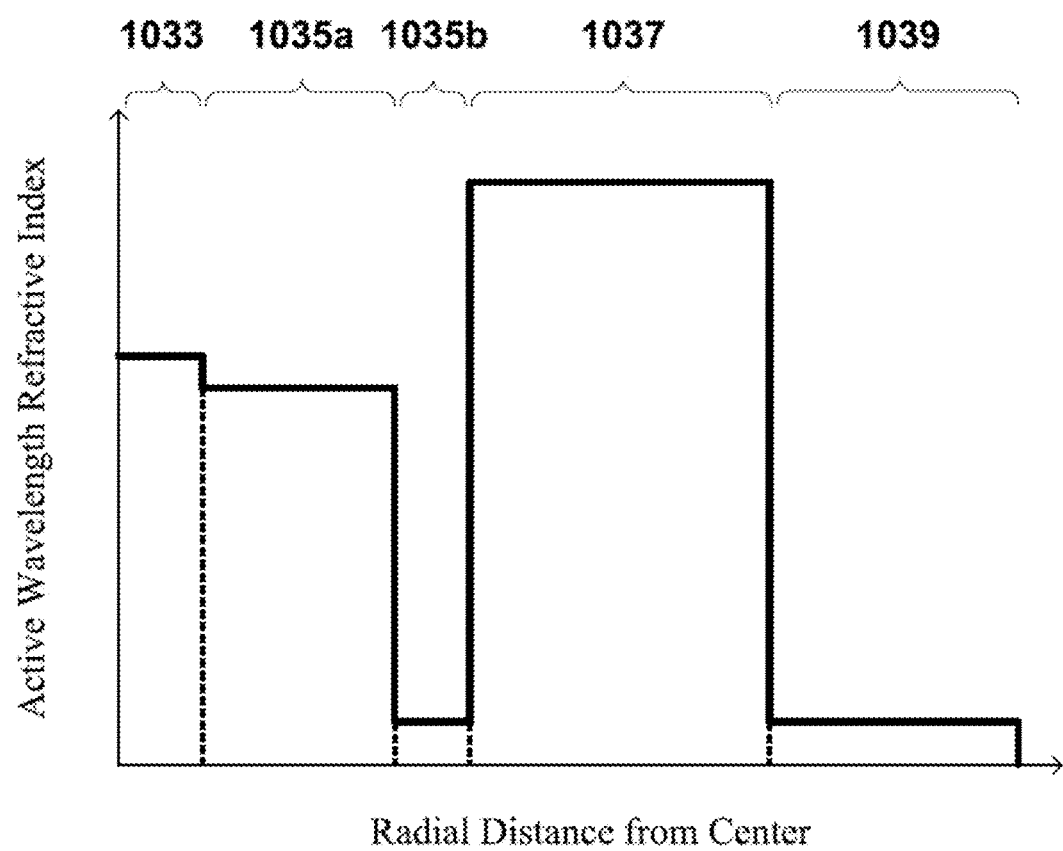
FIG. 10 is a graphical depiction of a refractive index profile of an optical fiber, according to example embodiments.

As described above, when present the one or more first claddings (135 in FIG. 2) immediately surround the inner core and are configured to substantially confine one or more guided modes at the active wavelength in the inner core. Accordingly, the one or more first claddings have a substantially lower refractive index at the active wavelength than does the inner core. In certain embodiments, the one or more first claddings have a substantially lower refractive index at the pump wavelength than does the inner core in such cases, the glass materials of the inner cladding(s) and of the inner core can be of the same type (e.g., silicate glasses with different dopants), which provides ease of manufacture and improved thermomechanical properties. While in some embodiments there is a single first cladding annularly disposed between the inner core and the annular pump core, in other embodiments there is more than one first cladding between the inner core and the annular pump core. In certain such embodiments, the one or more first claddings can include a pedestal cladding disposed immediately outside the inner core in order to provide for single mode guidance of radiation of the active wavelength in the inner core, as described above for the active optical fiber; in such embodiments, the other cladding layers of the one or more first claddings can be selected to provide for the desired confinement between the inner core and the annular pump core. A refractive index profile of an example of such a bridge optical fiber is shown in FIG. 10. In the bridge optical fiber of FIG. 10, the inner core 1033 is surrounded by one or more (here, two) first claddings 1035*a* and 1035*b*, First cladding 1035*a* is a pedestal cladding, having a refractive index at the active wavelength (e.g., and at the pump wavelength as well) that is only slightly less than the refractive index of the inner core at the active wavelength. First cladding 1035*b* has a much lower refractive index, and can provide the desired confinement of the annular pump core from the inner core.

In certain embodiments of the bridge optical fibers as otherwise described throughout this disclosure, the one or more first claddings have an average refractive index at least 0.001, at least 0.002, or at least 0.003 less than the refractive index of the core (at the active wavelength).

In certain embodiments of the bridge optical fibers as otherwise described throughout this disclosure, the one or more first claddings have an average refractive index at least 0.001, at least 0.002, or at least 0.003 less than the refractive index of the annular pump core (at the pump wavelength).

In certain embodiments of the bridge optical fibers as otherwise described throughout this disclosure, the one or more first claddings are at least 10 microns in thickness, at least 20 microns in thickness, at least 30 microns in thickness, or even at least 40 microns in thickness.

As described above with respect to FIG. 2, disposed in between the one or more first claddings and the one or more outer claddings 1039 is the annular pump core 1037. The annular pump core 1037 is the region of the bridge optical fiber configured to guide radiation of the pump wavelength. The person of ordinary skill in the art will appreciate that, in many embodiments, some radiation of the pump wavelength will propagate in the inner core 1033, in the one or more first claddings 1035*a*/1035*b*, or in the one or more outer claddings 1039. But the bridge optical fiber is desirably configured such that a majority (e.g., at least about 50%, at least about 70%, or even at least about 90%) of the radiation of the pump wavelength (e.g., from one or more first pump sources) propagates in the annular pump core 1037 at the output end of the bridge optical fiber. In certain desirable embodiments of the systems and methods described herein, the annular pump core is substantially centered in the cross-section of the bridge optical fiber. Similarly, in certain desirable embodiments, the annular pump core is circularly symmetric, or formed as a regular polygon. But the person of ordinary skill in the art will appreciate the annular pump core can in other embodiments have an asymmetric cross-sectional profile (e.g., to provide birefringence and desired polarization effects to the bridge optical fiber).

Figure 11:
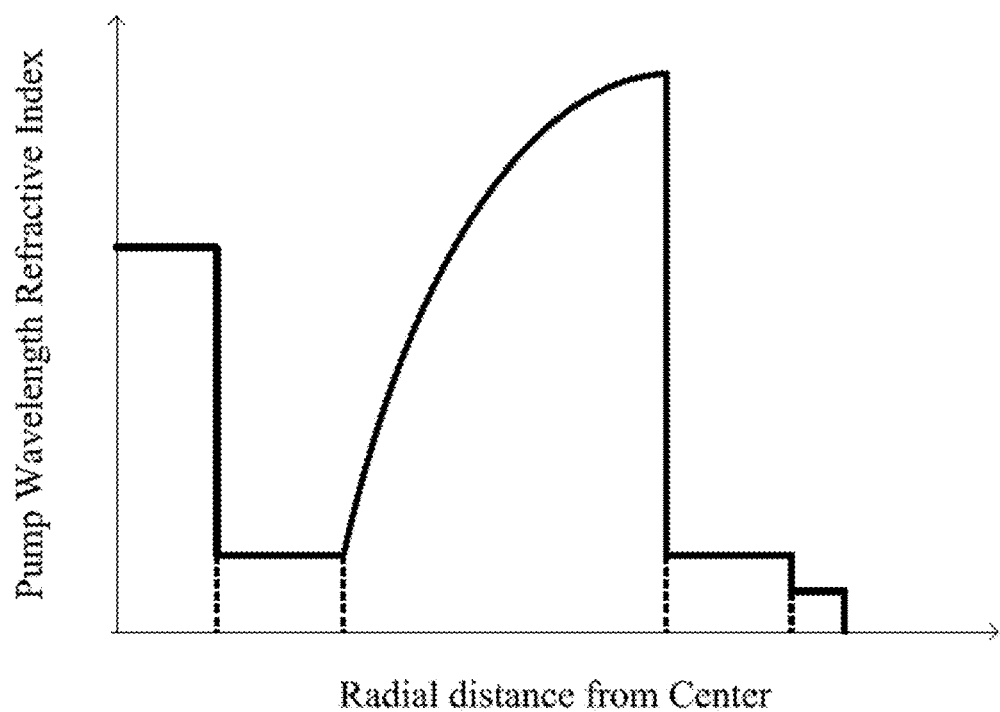
FIG. 11 is a graphical depiction of a refractive index profile of an optical fiber, according to example embodiments.
Figure 12:
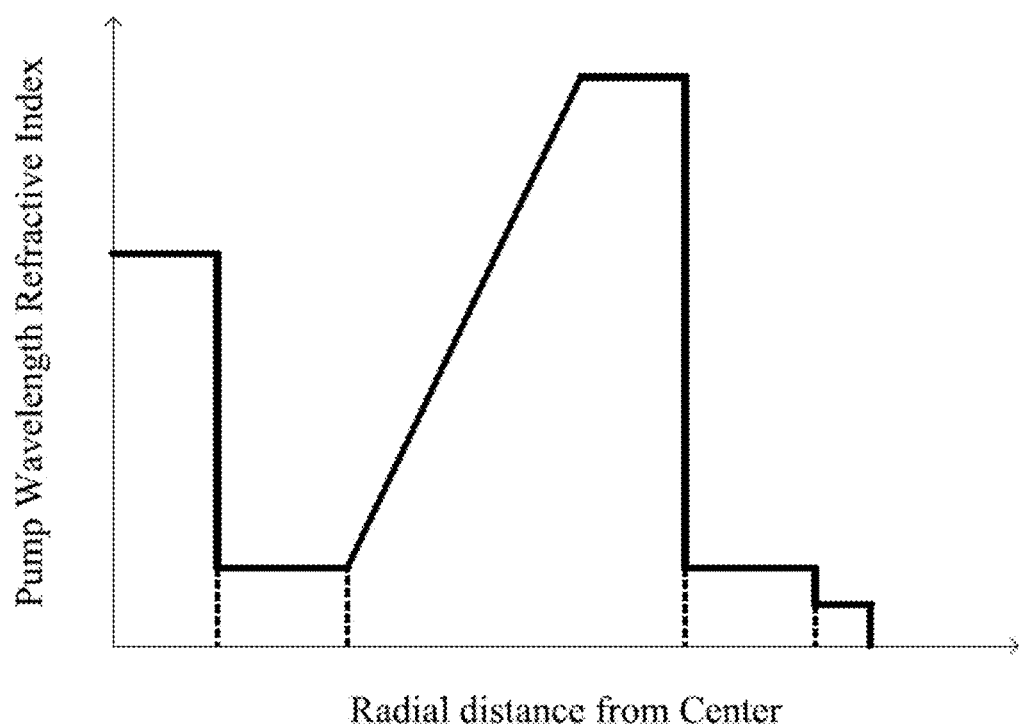
FIG. 12 is a graphical depiction of a refractive index profile of an optical fiber, according to example embodiments.
Figure 13:
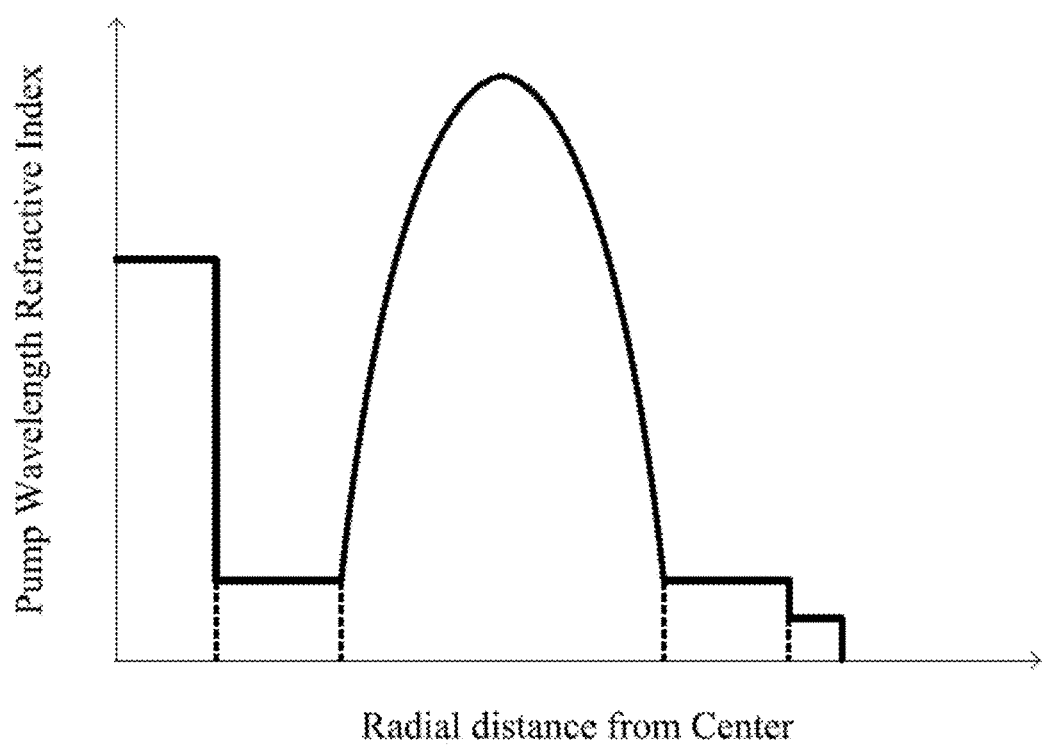
FIG. 13 is a graphical depiction of a refractive index profile of an optical fiber, according to example embodiments.

In certain embodiments (e.g., as described above with respect to FIG. 9), the annular pump core has a substantially constant refractive index (i.e., a step-index optical fiber). But in other embodiments, the annular pump core has a graded or otherwise varying refractive index. FIGS. 11-13 depict various alternative pump wavelength refractive index profiles for a bridge optical fiber. In certain embodiments, and as shown in FIGS. 11-13, the maximum refractive index at the pump wavelength of the annular pump core is substantially away from the inner edge thereof. For example, the maximum or refractive index at the pump wavelength of the annular pump core is at least about ⅓, or even at least about ½ of the annular length of the annular pump core from the inner edge of the annular pump core. In certain embodiments, and as shown in FIGS. 9-13, a substantial portion (e.g., at least ⅓, at least ½, at least ¾, or even at least about 9/10) of the annular pump core has a refractive index at the pump wavelength greater than the refractive index at the pump wavelength of the inner core. The person of ordinary skill in the art will appreciate that various annular pump core pump wavelength refractive index profiles will shape radiation of the pump wavelength in various ways. For instance, radiation of the pump wavelength may be better confined to the center, radially, of the annular pump core using the design of FIG. 13 than the designs of FIGS. 11 and 12.

As described above, the one or more outer claddings are disposed immediately surrounding the annular pump core and, together with the one or more first claddings (when present), serve to substantially confine radiation of the pump wavelength in the annular pump core. In some embodiments there may be more than one outer cladding surrounding the annular pump core. The person of ordinary skill in the art will appreciate that the bridge optical fiber can include one or more polymeric coatings at its outside surface; these can not only protect the glass of the optical fiber, but also serve optically as one or more of the outer claddings.

Figure 14:
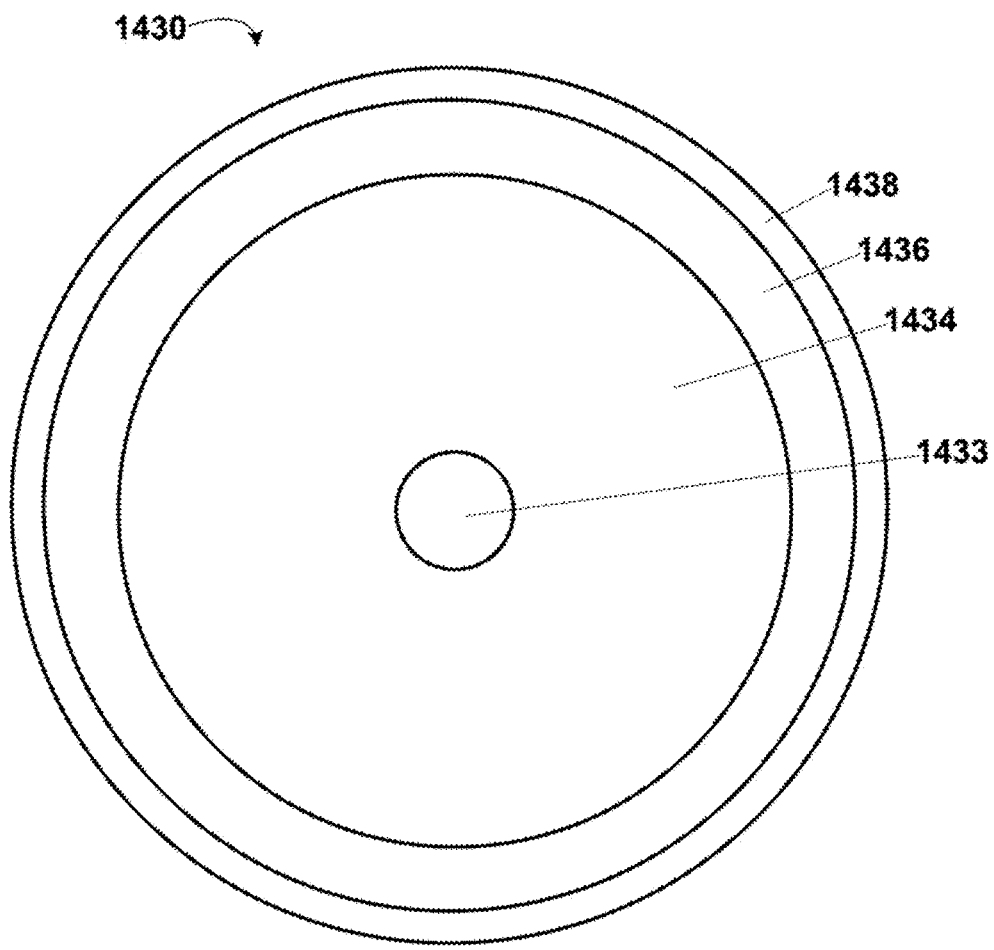
FIG. 14 is a schematic cross-sectional view of a bridge optical according to example embodiments

As described above, the one or more first claddings are optional. In certain embodiments (e.g., when the rare earth dopant in the active optical fiber is other than thulium) the one or more first claddings are not present. The person of ordinary skill in the art will nonetheless appreciate that such a bridge optical fiber can provide a low degree of overlap between radiation of pump wavelength and the radiation of the active wavelength in initial section of the active optical fiber, i.e., as measured in any manner as described above. For example, in certain embodiments of the bridge optical fibers as otherwise described herein, the pump core immediately surrounds the inner core. One example of such a bridge optical fiber is shown in cross-sectional schematic view in FIG. 14. The bridge optical fiber 1430 has an inner core 1433, an annular pump core 1434 disposed about the inner core and one or more outer claddings 1436 disposed about the annular pump core. A polymer coating 1438 is disposed about the one or more outer claddings 1436.

Figure 15:
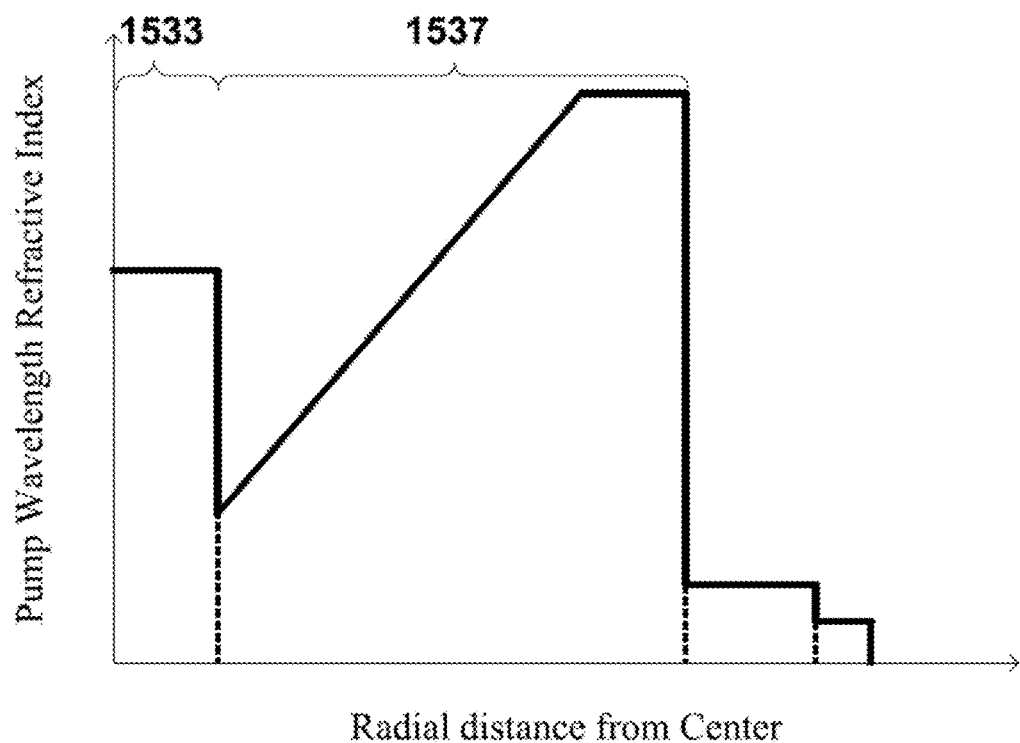
FIG. 15 is a graphical depiction of a refractive index profile of an optical fiber, according to example embodiments.
Figure 16:
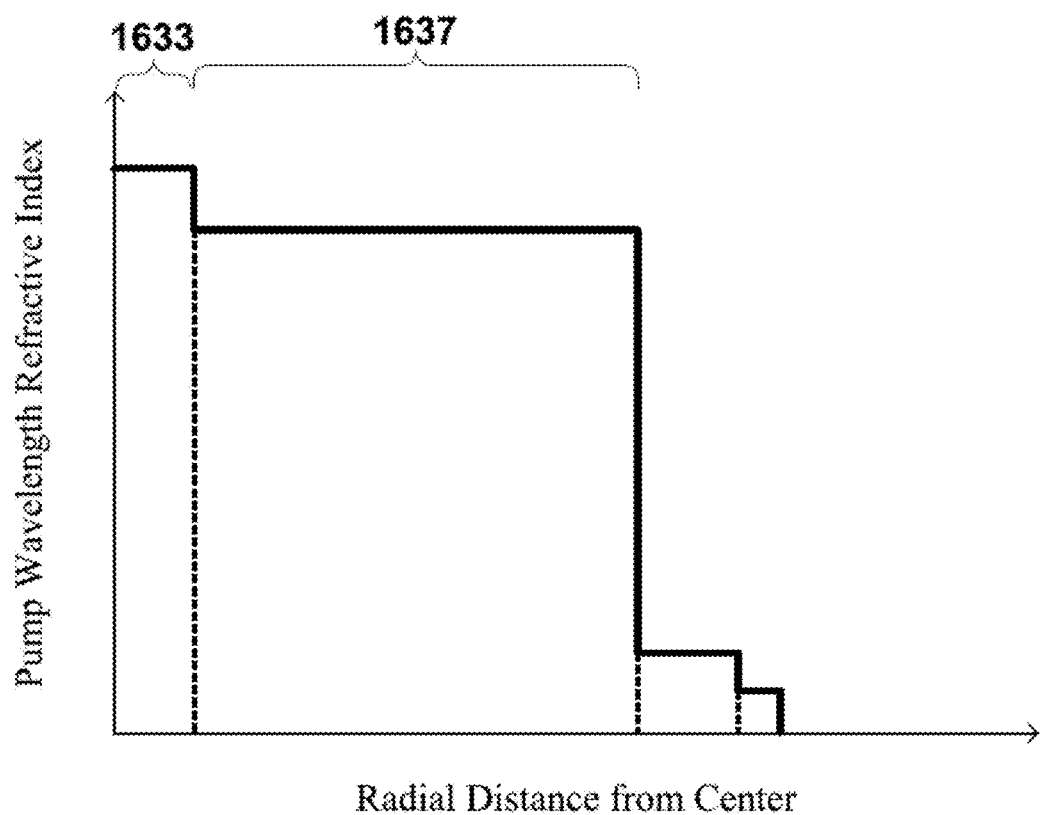
FIG. 16 is a graphical depiction of a refractive index profile of an optical fiber, according to example embodiments.

An example of a refractive index profile for such a bridge optical fiber is shown in schematic cross-sectional view in FIG. 15. Here, the refractive index of the pump core 1537 at the pump wavelength is less than that of the inner core 1533 at the interface therebetween, but increases to a value above that of the inner core at positions more remote from the inner core. Another example of a refractive index profile for such a bridge optical fiber is shown in schematic cross-sectional view in FIG. 16. Here, the refractive index profile of the pump core 1637 remains below that of the inner core 1633, but the pump core is big enough to provide a desired low overlap between radiation of pump wavelength and the radiation of the active wavelength in initial section of the active optical fiber, i.e., as measured in any manner as described above.

The bridge optical fibers described herein can have a passive (i.e., non-amplifying) inner core, and in such cases they can be used to deliver pump radiation to an active optical fiber as described herein. In other embodiments, however, the bridge optical fibers as described herein can themselves be configured as active optical fibers, e.g., with the inner core having a rare earth dopant such as ytterbium, neodymium, erbium, or, advantageously, thulium. In such embodiments the fiber can be configured as otherwise described herein but with respect to the optical fiber itself, e.g., so that less than 30% of the intensity distribution at the pump wavelength fiber overlaps the inner core of the active optical fiber. Such an optical fiber can be pumped with pump radiation in a conventional manner, or using a (passive) bridge optical fiber as described herein.

The bridge optical fibers described herein can be made from conventional material using conventional methods in the art. For example, the optical fiber can be made using various silica-based glasses (e.g., silicates such as germano-silicates, borosilicates, phosphosilicates, aluminosilicates, fluorosilicates, and combinations thereof), which can include additional dopants as is conventional. Conventional dopants germanium, fluorine, aluminum, phosphorus, and boron) can be used to provide the various regions of different refractive index in the bridge optical fibers as described herein. Conventional methods of making optical fibers (e.g., stacking together various rods and tubes of different refractive indices, followed by collapsing them to a preform and drawing the preform) can be used to make the bridge optical fibers described herein. Desirably, the optical fibers described herein do not include void space.

Advantageously, the bridge optical fibers described herein can be formed substantially from a single type of glass material (i.e., exclusive of any polymer coatings or outer cladding layers). For example, in certain embodiments, the inner core is formed from at least 60%, at least 65%, at least 70%, at least 75%, at least 80%, at least 85%, at least 90%, at least 95%, at least 99%, or even at least 99.9% silicon dioxide; the one or more first claddings are formed from at least 60%, at least 65%, at least 70%, at least 75%, at least 80%, at least 85%, at least 90%, at least 95%, at least 99%, or even at least 99.9% silicon dioxide; the annular pump core is formed from at least 60%, at least 65%, at least 70%, at least 75%, at least 80%, at least 85%, at least 90%, at least 95%, at least 99%, or even at least 99.9% silicon dioxide; and the one or more outer claddings (i.e., exclusive of any polymer coatings or outer cladding layers) are formed from at least 60%, at least 65%, at least 70%, at least 75%, at least 80%, at least 85%, at least 90%, at least 95%, at least 99%, or even at least 99.9% silicon dioxide, in any combination. Additionally or alternatively, one or more of the outer claddings may comprise one or more polymers.

The person of ordinary skill in the art will set the refractive indices of the various core and cladding layers of the bridge optical fiber to provide the desired degrees of confinement as described herein, and as otherwise desired for a particular optical system. Desirably, the materials used in the bridge optical fiber have similar dispersion values, such that the refractive index difference between any given layers is substantially the same within about 20%) at the pump wavelength and at the amplified wavelength.

Figure 33:
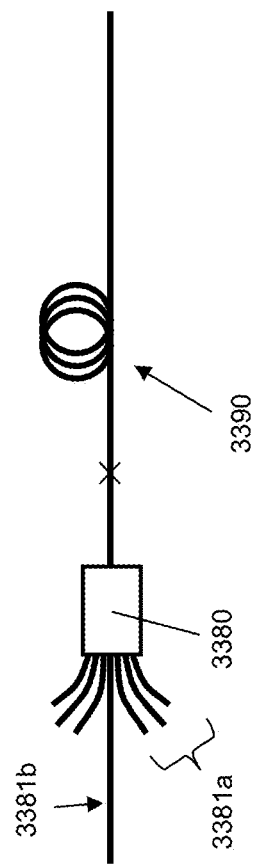
FIG. 33 is a schematic cross-sectional view of an amplification system according to one embodiment of the disclosure.

As described above, the disclosure also provides an active bridge optical fiber. The active bridge optical fiber can be configured substantially similarly to the bridge optical fibers as otherwise described herein, but with the inner core being an active core, i.e., configured to amplify radiation of the active wavelength when pumped with radiation of a pump wavelength, e.g, by including one or more rare earth ions (for example, thulium, ytterbium, neodymium, or erbium). The active bridge active optical fiber is configured (e.g., via its overall refractive index profile) such that less than 30% (e.g., less than 20%, less than 10%, or even less than 5%) of the intensity distribution at the pump wavelength overlaps the inner core of the active bridge optical fiber. Such an active bridge optical fiber can be used as an active optical fiber in an amplifier system, i.e., by being optically coupled to a source of pump radiation: the relatively low degree of overlap between the annular pump core and the inner core will tend to spread the pump absorption and the resulting heat generation along a longer length of the fiber, thus increasing the damage power threshold. A separate passive bridge optical fiber can be to couple the pump radiation into the active bridge optical fiber. An embodiment of such a system is shown in schematic view in FIG. 33. Here, active bridge optical fiber 3390 is coupled to the output of pump coupler 1200, so that it can be pumped by pump radiation introduced through pump fibers 3381a. A signal fiber 3381b can be used to transmit a seed signal through the coupler to the active signal optical fiber. In certain embodiments, the output fiber of the coupler can be a (passive) bridge optical fiber as described herein, or a length abridge optical fiber can be used to couple the pump radiation from the coupler to the active bridge optical fiber. The person of ordinary skill in the art will appreciate that the amplifier device of FIG. 33 can alternatively be configured in a counter-pumping configuration, or with both co- and counter-pumping.

III. EXAMPLE METHODS

Another aspect of the disclosure is a method for generating or amplifying optical radiation having an active wavelength. The method includes
  providing an optical fiber amplifying system as described herein;
  transmitting radiation of the pump wavelength from the one or more first optical pump sources to the input end of the bridge optical fiber;

transmitting the radiation of the pump wavelength from the input end of the bridge optical fiber to the output end of the bridge optical fiber; and transmitting the radiation of the pump wavelength from the output end of the bridge optical fiber to the first end of the active optical fiber, thereby generating or amplifying radiation of the active wavelength in the active optical fiber.

The person of ordinary skill in the art will appreciate that any embodiment described above can be used in the methods described herein, with the methods being adapted accordingly. For example, when an element described above is described as being adapted to or configured to perform a function, the person of ordinary skill in the art will appreciate that such functions can be performed as a method step in corresponding methods of the disclosure.

For example, in certain embodiments of the methods described herein, the method further includes transmitting radiation of the active wavelength from a seed source to the active core of the active optical fiber. The radiation of the active wavelength can thus be amplified in the active optical fiber. In certain embodiments (e.g., in a co-pumped configuration), the radiation of the active wavelength is transmitted from the seed source to the active core of the active optical fiber through the inner core of the bridge optical fiber and through the first end of the active optical fiber, for example, as shown in FIG. 1. In certain embodiments (e.g., in a counter-pumped configuration), the radiation of the active wavelength is transmitted from the seed source to the active core of the active optical fiber through the second end of the active optical fiber, as shown in FIG. 3.

As described above, the use of the bridge optical fiber can result in spreading out the amplification or generation of radiation for a longer distance along the active optical fiber, and can thus reduce the degree of temperature increase in the first section of the active optical fiber. For example, in certain embodiments, the maximum temperature reached in the first five centimeters of the active optical fiber at the first end thereof is no more than about 250° C., no more than about 200° C., no more than 150° C., or even no more than 100° C. In certain embodiments, the maximum temperature (i.e., as measured in ° C.) reached in the first five centimeters of the active optical fiber is no more than 75% of, or even no more than 50% of the maximum temperature (i.e., as measured in ° C.) reached in the first five centimeters of the active optical fiber in an identical system lacking the bridge optical fiber.

As described above, the use of the bridge optical fiber can result in a decreased overlap between the radiation of pump wavelength and the radiation of the active wavelength in initial section of the active optical fiber. Thus, in certain embodiments of the methods described herein, at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 30% of the radiation of the pump wavelength. For example, in certain embodiments, at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength at the first end of the active optical fiber in an amount corresponding to less than 25%, less than 20%, less than 15%, less than 10%, or less than 5% of the radiation of the pump wavelength. A similar relationship can be true at the output end of the bridge optical fiber. Thus, in certain embodiments, at the output end of the bridge optical fiber, radiation of the active wavelength is spatially overlapped, in a region whose edges are defined by the points where the radiation intensity of the active wavelength is 5% of the peak intensity of the radiation of the active wavelength, by radiation of the pump wavelength at in an amount corresponding to less than 30% of the radiation of the pump wavelength. For example, in certain embodiments, at the output end of the bridge optical fiber, radiation of the active wavelength is spatially overlapped, in a region whose edges are defined by the points where the radiation intensity of the active wavelength is 5% of the peak intensity of the radiation of the active wavelength, by radiation of the pump wavelength at in an amount corresponding to less than 25%, less than 20%, less than 15%, less than 10%, less than 5%, or even less than 1% of the radiation of the pump wavelength.

Another aspect of the disclosure provides a method for providing amplified radiation using an active bridge optical fiber as described above (i.e., a bridge optical fiber that has an inner core adapted to provide amplified radiation, e.g., having a rare earth such as thulium doped therein). The method includes providing an active bridge optical fiber as described herein; and transmitting radiation of the pump wavelength from the one or more first optical pump sources to the input end of the active bridge optical fiber (e.g., by using a passive bridge optical fiber as described herein);

so that less than 30%, less than 20%, less than 10% or even less than 5% of the intensity distribution at the pump wavelength fiber overlaps the inner core of the active bridge optical fiber (or as otherwise described herein but with respect to the active bridge optical fiber itself).

The method can otherwise be performed in any manner as described above,

IV. SIMULATION EXAMPLE

Figure 17:
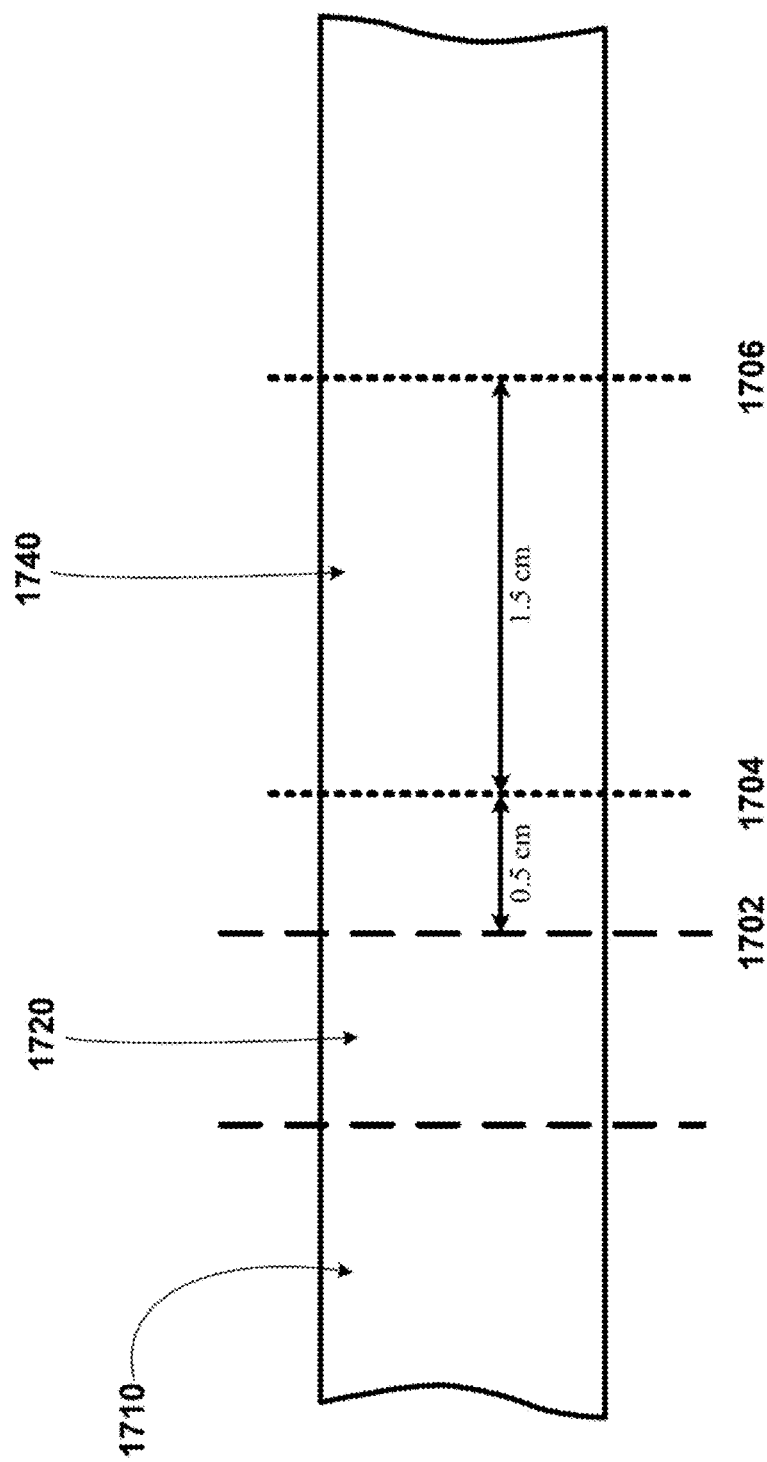
FIG. 17 is a schematic side view of a portion of an optical fiber amplifying system, according to example embodiments.
Figure 18:
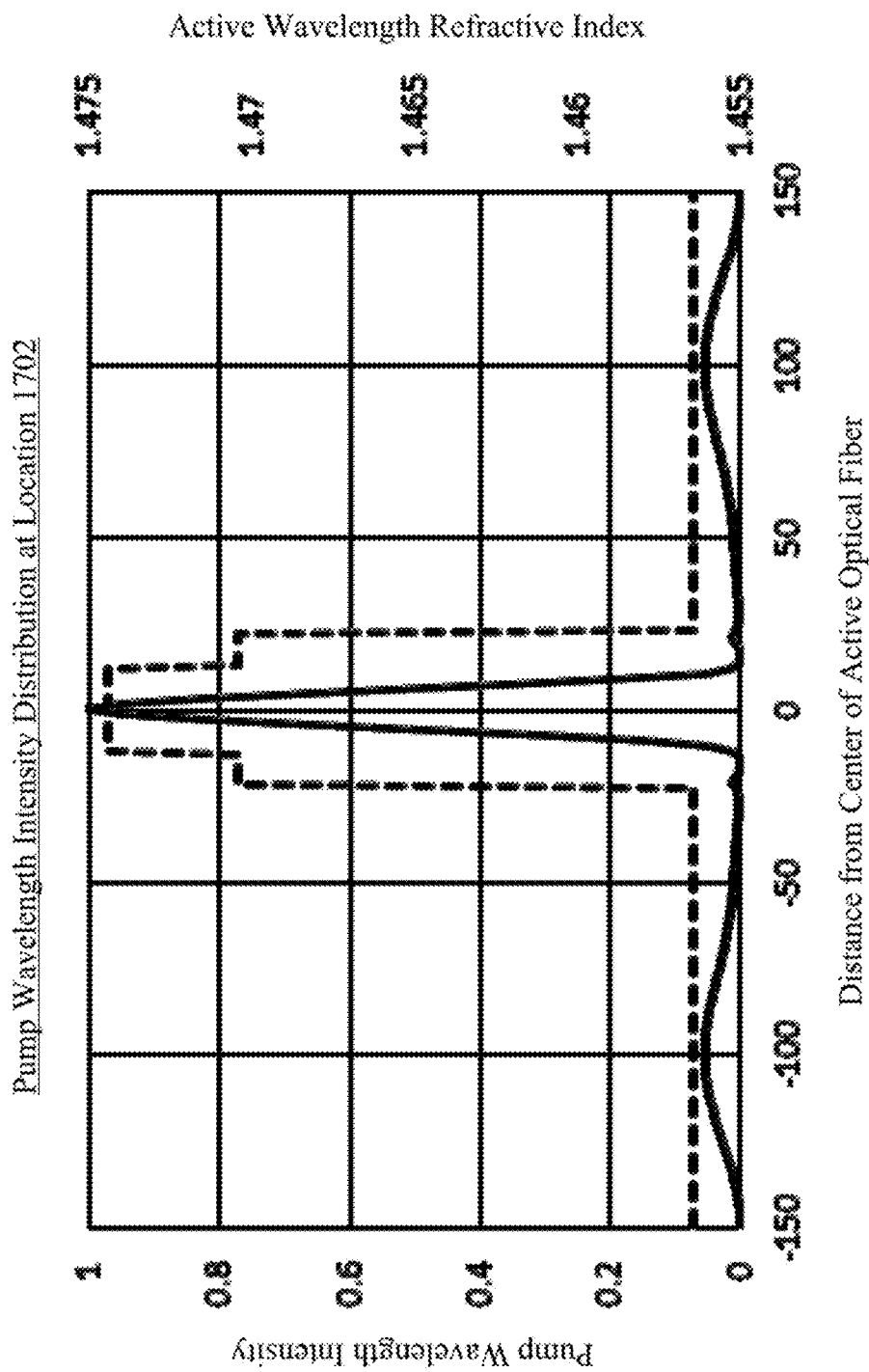
FIG. 18 is a graphical depiction of an intensity profile, according to example embodiments.
Figure 19:
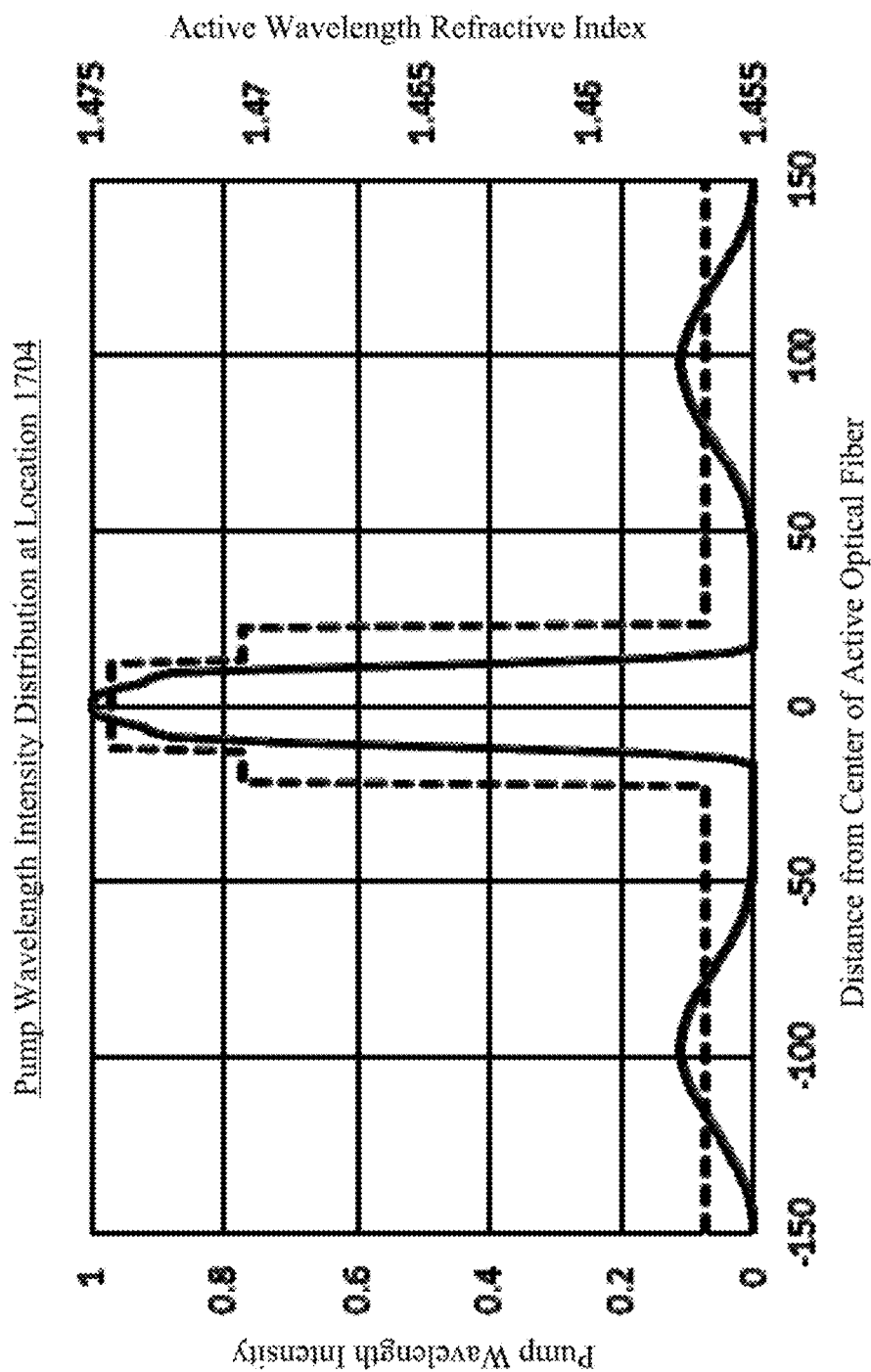
FIG. 19 is a graphical depiction of an intensity profile, according to example embodiments.
Figure 20:
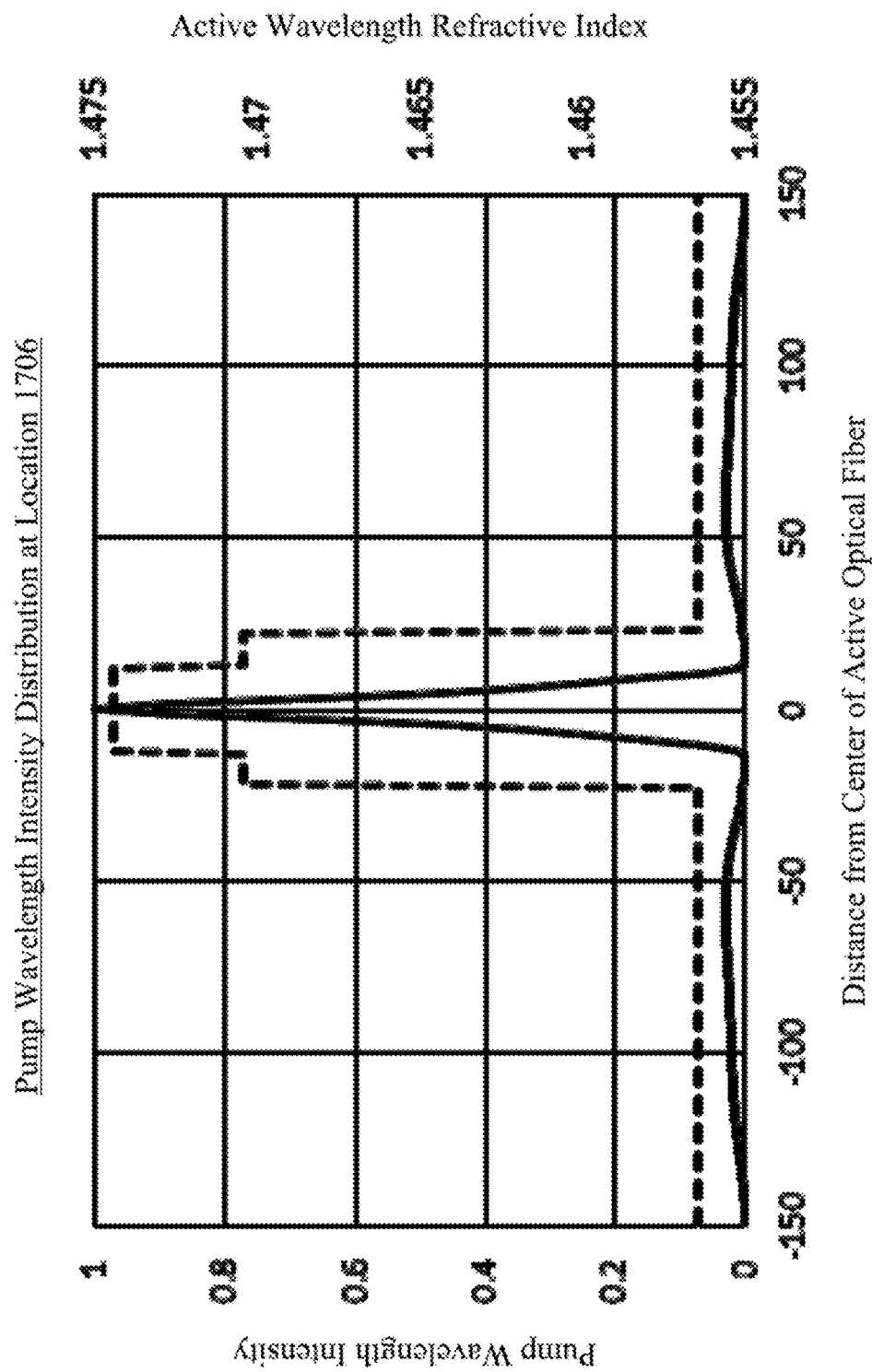
FIG. 20 is a graphical depiction of an intensity profile, according to example embodiments.

As described above, the use of the bridge optical fiber can result in a decreased overlap between the radiation of the pump wavelength and the active core of the active optical fiber. The inventors have performed a simulation based on the system shown in partial schematic view in FIG. 17. In the system of FIG. 17, there is a pump optical fiber 1710 (e.g., the optical fiber attached to the output of the output port 128 of the pump coupler or combiner 126 in FIG. 1) whose output is connected to one end of a double-clad output fiber 1720. The end of the double-clad output fiber 1720 that is opposite of the pump optical fiber 1710 is connected to an active optical fiber 1740 (e.g., the active optical fiber 140 of FIG. 1). Given certain boundary conditions, a computer simulation (e.g., one that computationally/digitally implements the finite element method or the finite difference method) can be performed on the system of FIG. 17. The results of such a simulation are shown in FIGS. 18-20, which respectively present intensity profiles for the pump wavelength when measured at a point 0 cm into the active optical fiber (indicated in FIG. 17 by reference numeral 1702), at a point 0.5 cm into the active optical fiber (indicated in FIG. 17 by reference numeral 1704), or at a point 2 cm into the active optical fiber (indicated in FIG. 17 by reference numeral 1706). For each figure (FIGS. 18-20), the dashed lines represent the active wavelength refractive index profile within the active optical fiber 1740, and the solid lines represent the pump wavelength intensity profile at the given distance from the entrance to the active optical fiber 1740 (0 cm, 0.5 cm, and 2 cm). For the simulation results shown, the pump wavelength was set to 790 nm, the rare earth dopant of the active core region within the active optical fiber 1740 was thulium, the pump optical fiber 1710 had a 200 μm core and a 400 μm cladding, and the pump power was assumed to be evenly distributed within the active core region of the pump optical fiber 1710.

Figure 21:
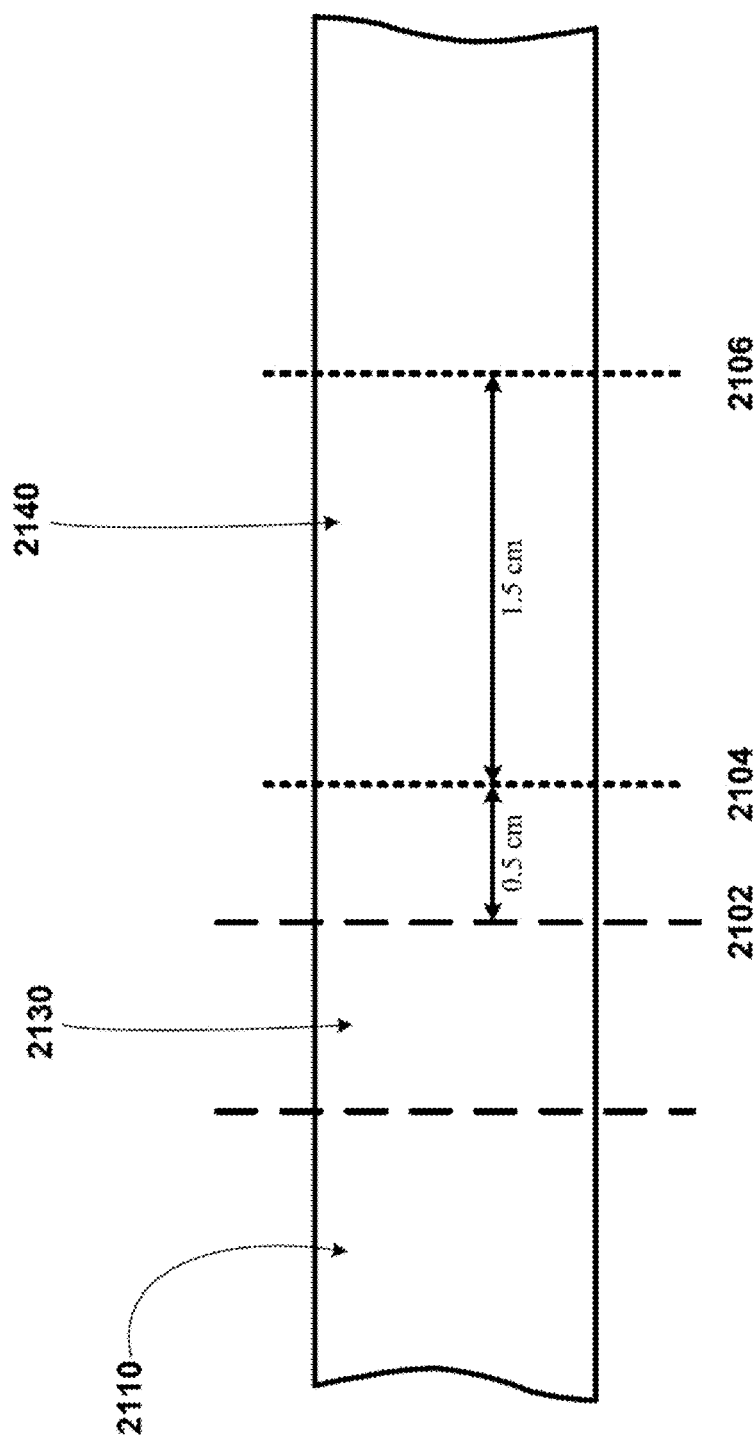
FIG. 21 is a schematic side view of a portion of an optical fiber amplifying system, according to example embodiments.

In contrast, in the system of FIG. 21, there is a pump optical fiber 2110 (e.g., the optical fiber attached to the output of the output port 128 of the pump coupler or combiner 126 in FIG. 1) whose output is connected to one end of a bridge optical fiber 2130 (e.g., the bridge optical fiber 130 in FIG. 1). The end of the bridge optical fiber 2130 that is opposite of the pump optical fiber 2110 is connected to an active optical fiber 2140 (e.g., the active optical fiber 140 of FIG. 1). A similar simulation to that performed to generate FIGS. 18-20 was performed. The results of the simulation follow in FIGS. 22-24, which respectively present intensity profiles for the pump wavelength when measured at a point 0 cm into the active optical fiber (indicated in FIG. 21 by reference numeral 2102), at a point 0.5 cm into the active optical fiber (indicated in FIG. 21 by reference numeral 2104), or at a point 2 cm into the active optical fiber (indicated in FIG. 18 by reference numeral 1806). For each figure (FIGS. 22-24), the dotted lines represent the active wavelength refractive index profile within the active optical fiber 2140, and the solid lines represent the pump wavelength intensity profile at the given distance from the entrance to the active optical fiber 2140 (0 cm, 0.5 cm, and 2 cm). Other than the replacement of the double-clad output fiber 1720 of FIG. 17 with the bridge optical fiber 2130 of FIG. 21, the simulation remained the same to produce the results in FIGS. 22-24 as they were to produce the results of FIGS. 18-20.

Figure 22:
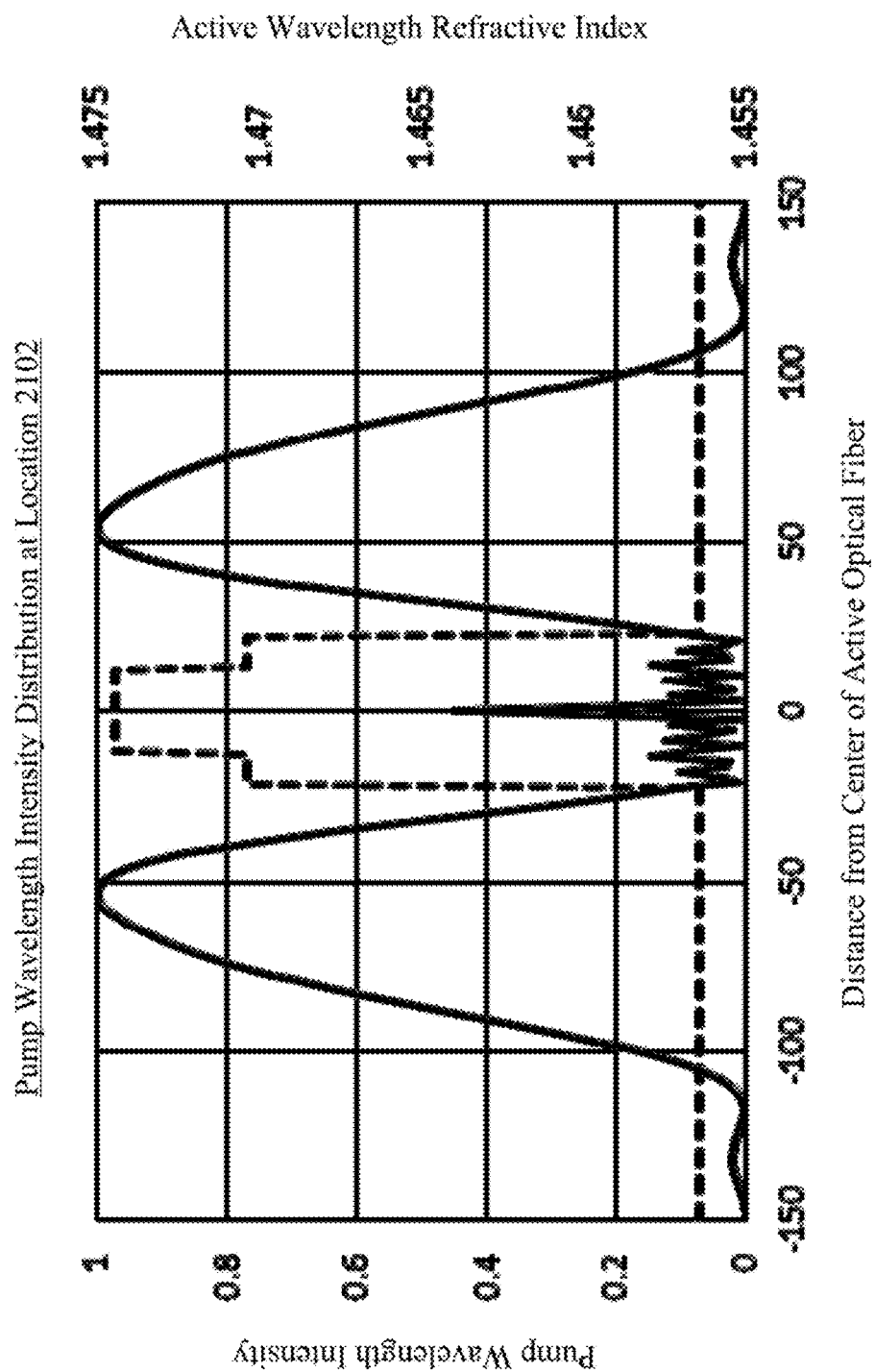
FIG. 22 is a graphical depiction of an intensity profile, according to example embodiments.
Figure 23:
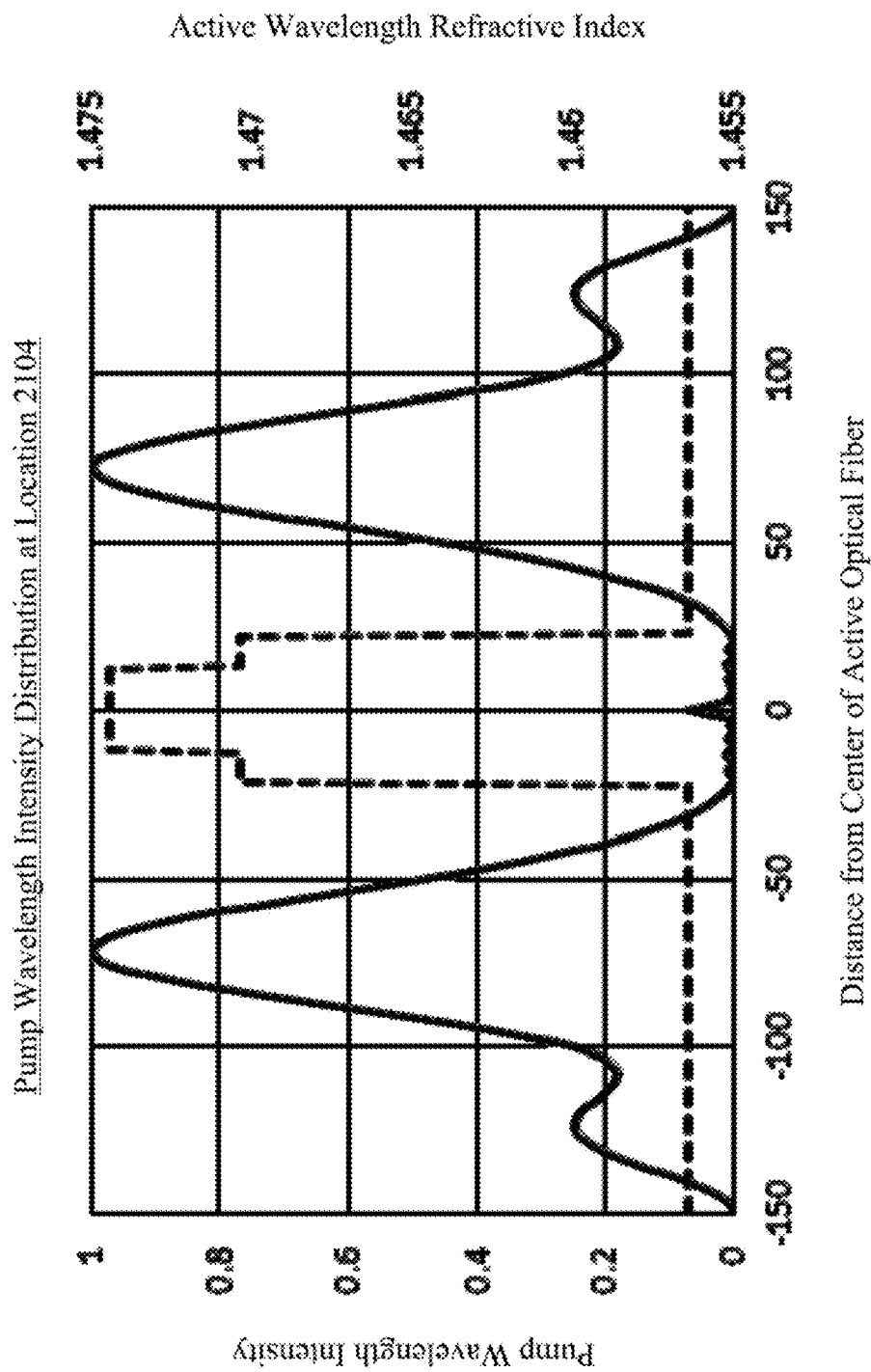
FIG. 23 is a graphical depiction of an intensity profile, according to example embodiments.
Figure 24:
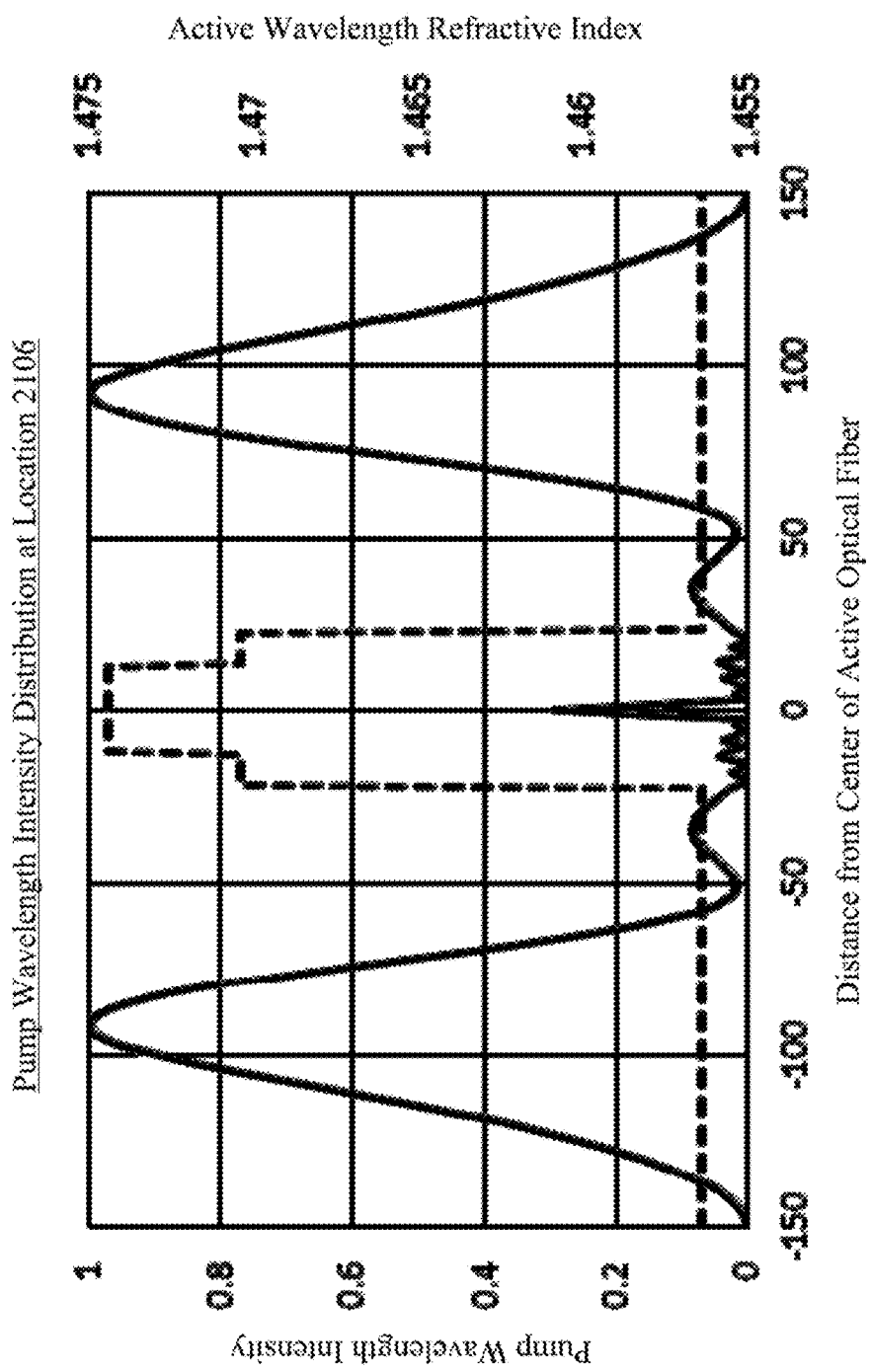
FIG. 24 is a graphical depiction of an intensity profile, according to example embodiments.

By comparison, the results of FIGS. 18-20 show a maximum 66% overlap of the pump wavelength intensity profile with the thulium doped core within the first 2 cm of the active optical fiber 1440, whereas the results of FIGS. 22-24 show a maximum 2% overlap of the pump wavelength intensity profile with the thulium doped core within the first 2 cm of the active optical fiber 2140. In both cases, the maximum was at the very beginning of the active optical fiber (z=0). This difference is attributable to the inclusion of the bridge optical fiber 2130 in the system of FIGS. 21-24. Further, this difference in overlap leads to less heat generation in the first portion of the active optical fiber 2140 of FIGS. 21-24 than in the active optical fiber 1740 of FIGS. 17-20.

V. EXAMPLE DEVICES

To demonstrate the performance of the systems described herein, a bridge optical fiber was fabricated and tested to determine the overlap between the pump radiation from a six-port coupler and a conventional active optical fiber.

Figure 25:
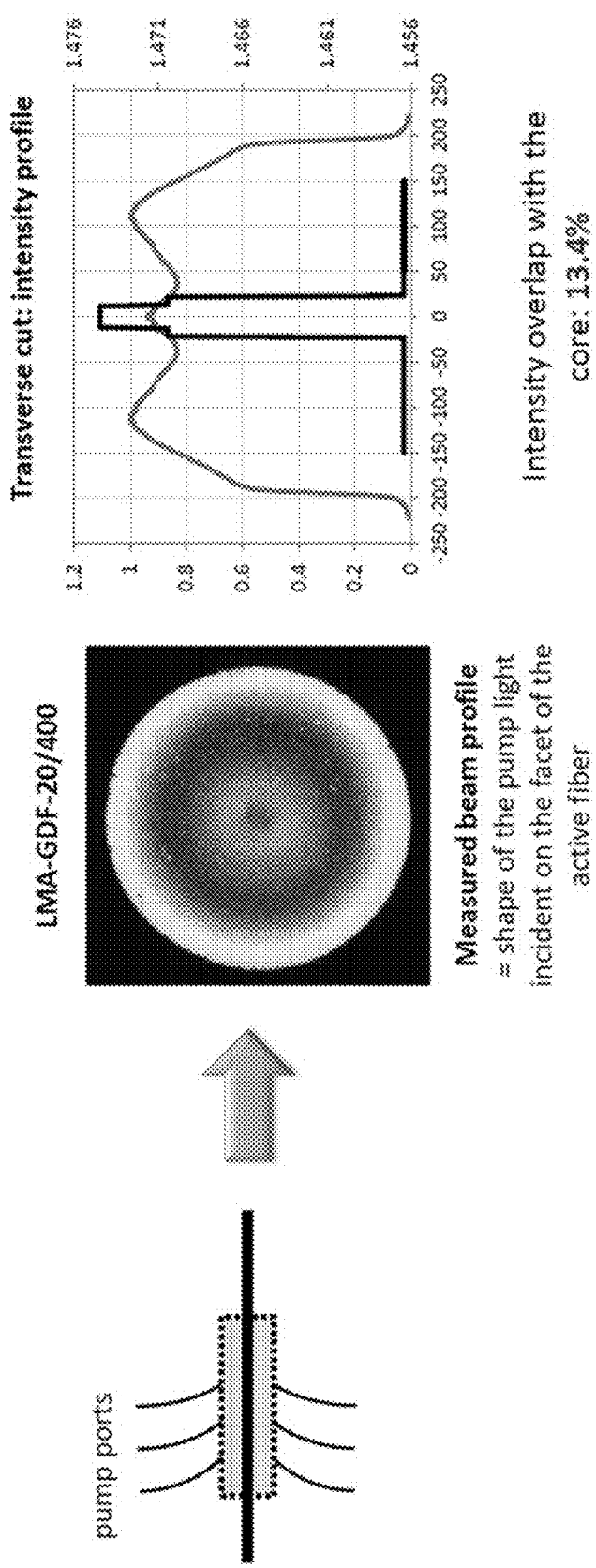
FIG. 25 is a set of diagrams related to a conventional example of a pump coupler as fabricated.

In a first, comparative example system, pump radiation from a 1 micron diode laser, 0.16 NA, split and coupled via optical fibers were coupled to two symmetrically-disposed pump inputs of a conventional 6-port pump coupler made as described in U.S. Pat. No. 7,991,255 having at its output a Nufem LMA-GDF-20/400 optical fiber (20 micron diameter core, 400 micron diameter pump core, numerical aperture 0.065). FIG. 25 shows the measured intensity profile at the output end of the coupler fiber, overlapped with the refractive index profile of a conventional active optical fiber having an inner core diameter of 25 microns and a pedestal diameter of 42 microns. As measured, 13.7% of the intensity distribution at the pump wavelength at the second end of the bridge optical fiber overlaps the inner core of the active optical fiber overlap between the intensity profile.

Figure 26:
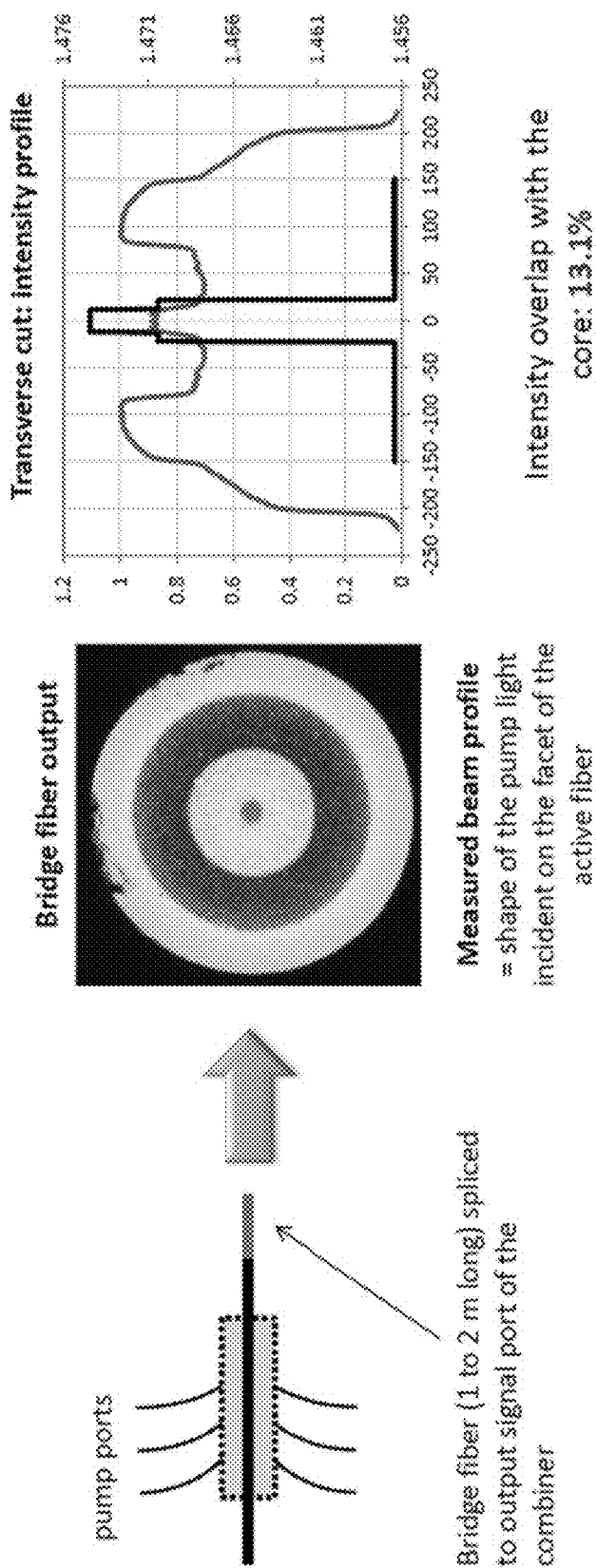
FIG. 26 is a set of diagrams related to an example of a pump coupler and bridge fiber according to the disclosure, as fabricated.
Figure 34:
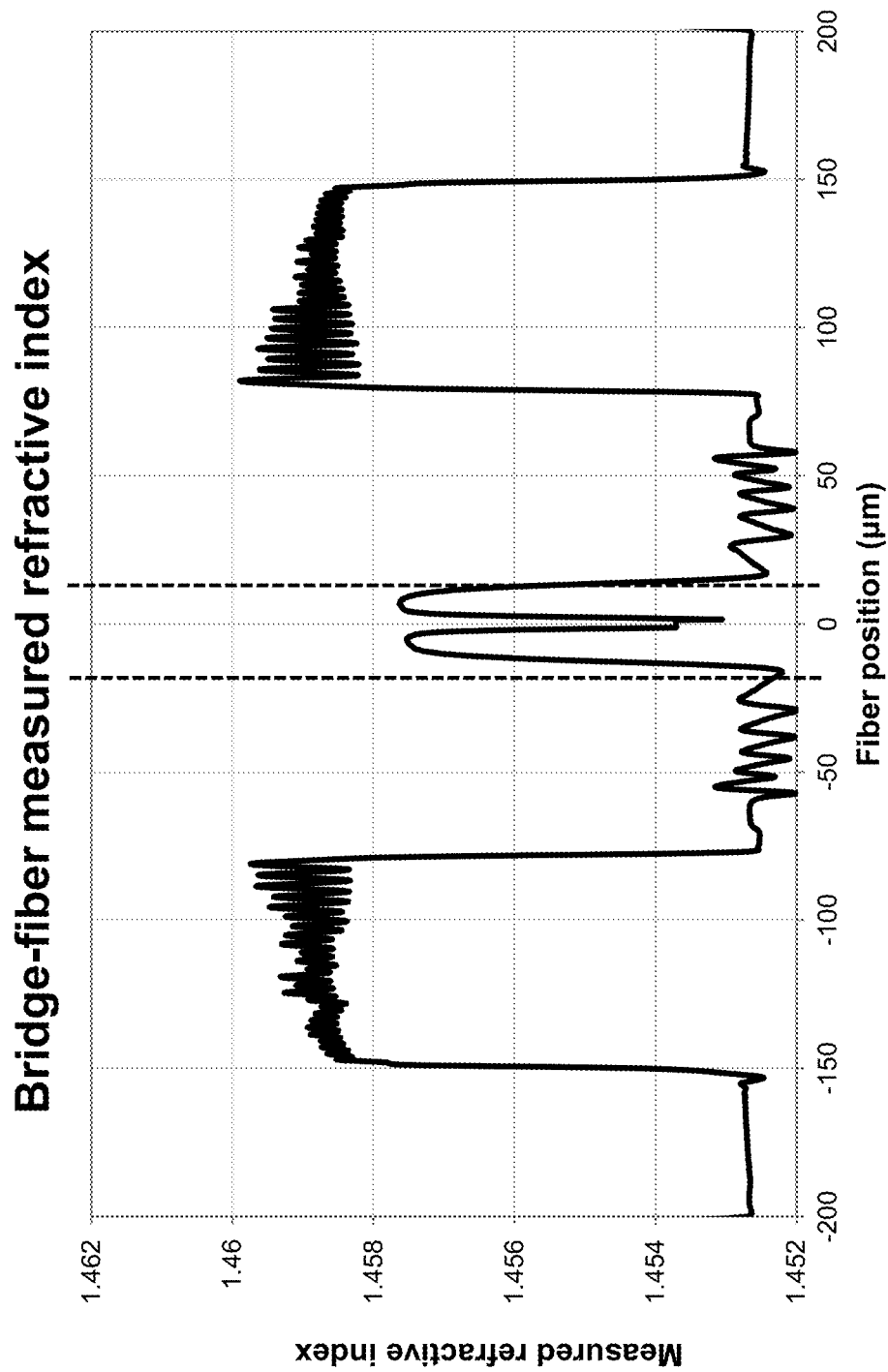
FIG. 34 is a refractive index profile for an optical fiber according to the disclosure.

In an example according to one embodiment of the present disclosure, a bridge optical fiber 1 in length is spliced at the output end of the output fiber (2 m) of the coupler as described above in the comparative example. The refractive index profile for this fiber is provided in FIG. 34. FIG. 26 shows the measured intensity profile at the output end of the bridge optical fiber, overlapped with the refractive index profile of a conventional active optical fiber having an inner core diameter of 25 microns and a pedestal diameter of 42 microns. As measured, 13.1% of the intensity distribution at the pump wavelength at the second end of the bridge optical fiber overlaps the inner core of the active optical fiber overlap between the intensity profile. The person of ordinary skill in the art will appreciate based on the present disclosure that use of a longer length of bridge optical fiber and/or coiling or otherwise bending the fiber can redistribute radiation in the bridge optical fiber so that the overlap is further reduced.

Figure 27:
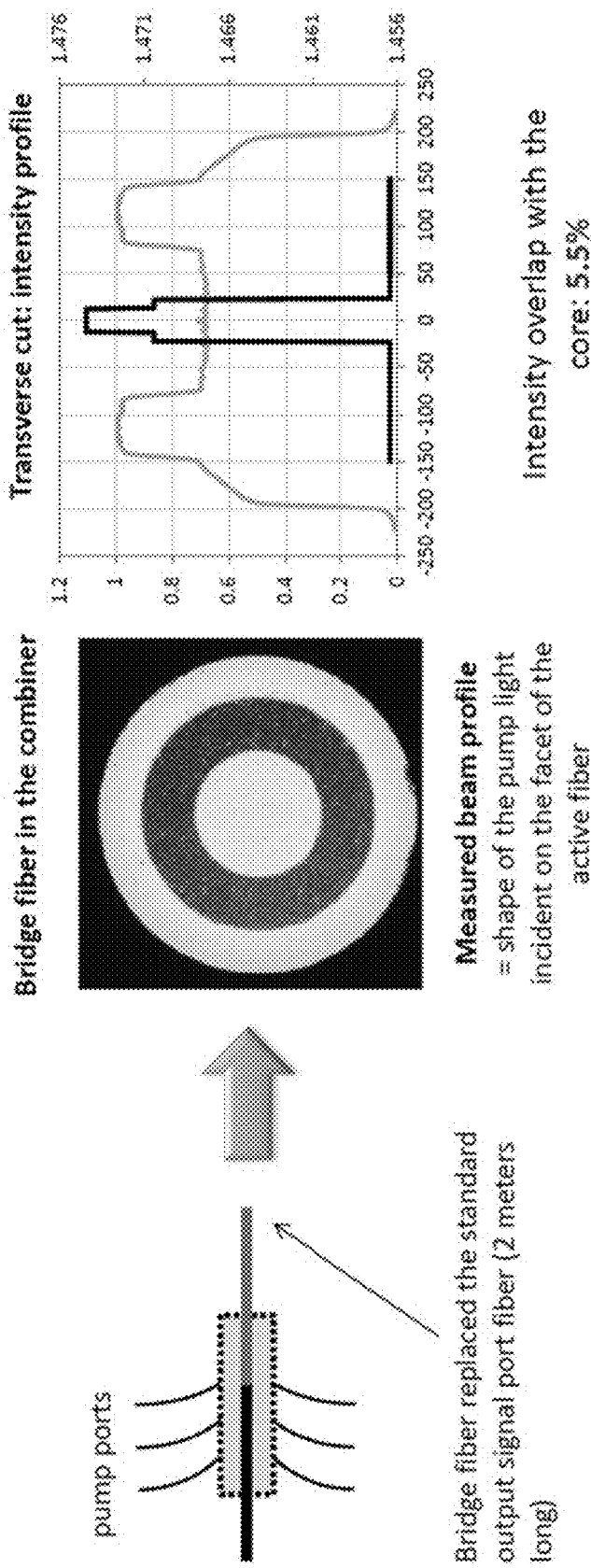
FIG. 27 is a set of diagrams related to another example of a pump coupler and bridge fiber according to the disclosure, as fabricated.
Figure 35:
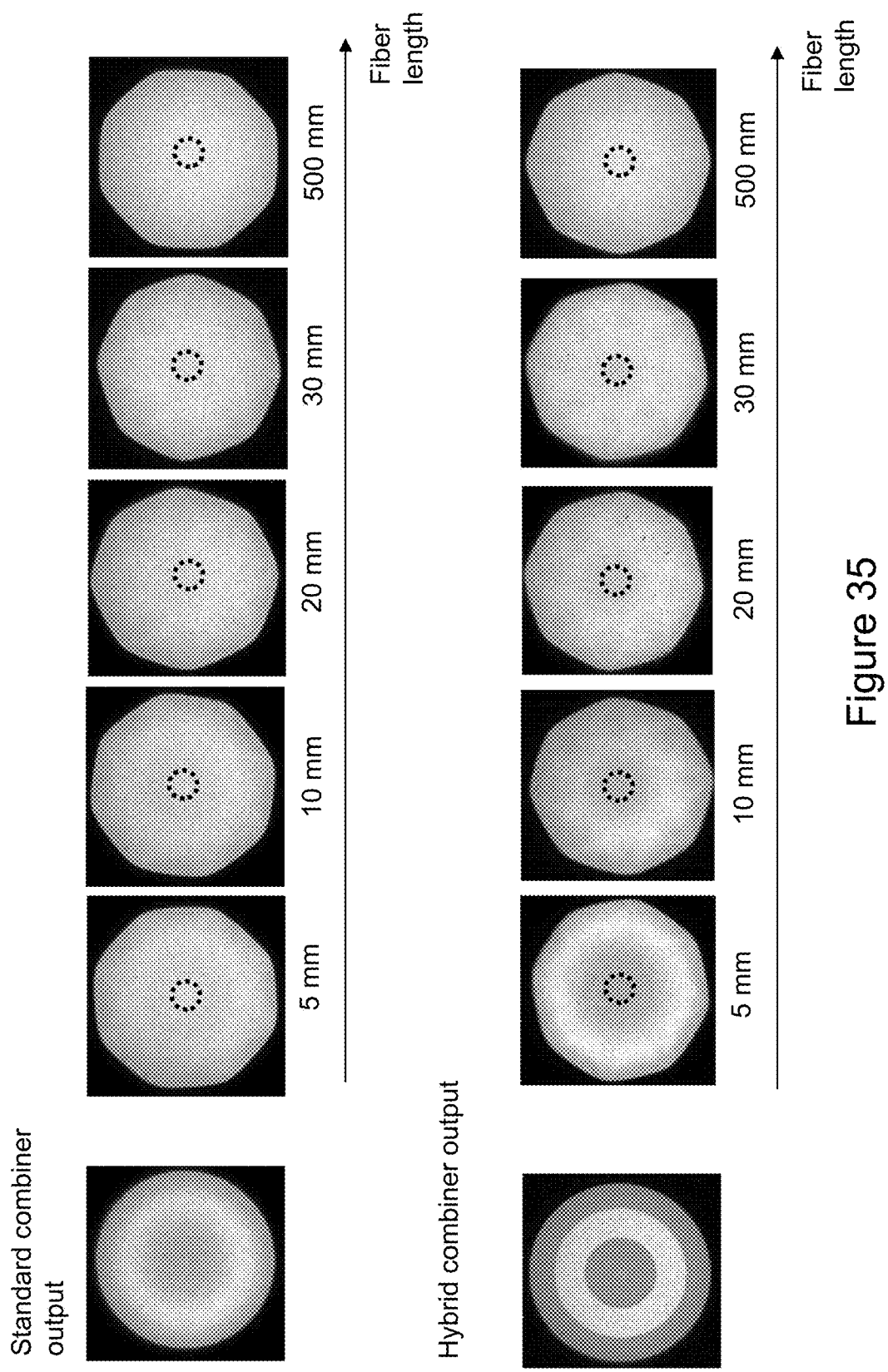
FIG. 35 is a set of photographs of a cut-back experiment comparing intensity profiles launched from a pump coupler of the disclosure and a conventional pump coupler.

The outputs of the pump couplers shown in FIGS. 25 and 27 were coupled to pure silica coreless octagon-shaped fibers. The octagon-shaped fibers were cut back and the intensity of pump radiation was imaged at a variety of points; FIG. 35 is a series of photographs showing the intensity patterns at various distances down the length of the octagon-shaped fiber, with a dashed circle indicating the central core of the fiber at the coupler output. Notably, the pump coupler using the bridge fiber (i.e., as in FIG. 27) distributed the pump radiation over a wider area over a longer distance than did the conventional pump coupler (i.e., as in FIG. 25).

In an example according to another embodiment of the present disclosure, the bridge optical fiber of the preceding example was used as the feed-through fiber in the construction of a coupler according to U.S. Pat. No. 7,991,255, which is hereby incorporated herein by reference in its entirety. The bridge optical fiber had a total length of 3 m total length, including coupler. FIG. 27 shows the measured intensity profile at the output end of the bridge optical fiber, overlapped with the refractive index profile of a conventional active optical fiber having an inner core diameter of 25 microns and a pedestal diameter of 42 microns. As measured, 5.5% of the intensity distribution at the pump wavelength at the second end of the bridge optical fiber overlaps the inner core of the active optical fiber overlap between the intensity profile.

VII. CONCLUSION

Various enumerated embodiments are further described below. The person of ordinary skill in the art will appreciate that the embodiments described below can be combined with one another in any combination and permutation.

Embodiment 1

An optical fiber amplifying system, the optical fiber amplifying system providing amplified optical radiation having an active wavelength, the optical fiber amplifying system comprising:
  one or more first optical pump sources, each configured to output radiation of a pump wavelength;

a bridge optical fiber, having an input configured to receive the radiation of the pump wavelength output by the one or more first optical pump sources and an output, the bridge optical fiber comprising:
- an inner core configured to guide radiation of the active wavelength, the inner core having an inner core active wavelength refractive index profile and an inner core pump wavelength refractive index profile;
- an annular pump core disposed about the inner core, the annular pump core being configured to guide radiation of the pump wavelength, the annular pump core having an annular pump core active wavelength refractive index profile and an annular pump core pump wavelength refractive index profile;
- optionally, one or more first claddings disposed between the inner core and the annular pump core, the one or more first claddings having a first cladding active wavelength refractive index profile and a first cladding pump wavelength refractive index profile; and
- one or more outer claddings disposed about the annular pump core, the one or more outer claddings having an outer cladding active wavelength refractive index profile and an outer cladding pump wavelength refractive index profile;
- wherein
  - the one or more first claddings (when present) and the annular pump core are configured to substantially confine one or more guided modes at the active wavelength in the inner core, and
  - wherein less than 30% of the intensity distribution at the pump wavelength at the second end of the bridge optical fiber overlaps the inner core of the active optical fiber, and
- an active optical fiber having a first end substantially directly coupled to the output of the bridge optical fiber, and a second end, the active optical fiber having an active core, a pump cladding surrounding the active core, and one or more outer claddings surrounding the pump cladding, the active optical fiber being configured to amplify radiation of the first active wavelength when pumped with radiation of the pump wavelength.

Embodiment 2

The optical fiber amplifying system according embodiment 1, wherein the one or more first optical pump sources comprise one or more laser diodes.

Embodiment 3

The optical fiber amplifying system according to embodiment 1 or embodiment 2 wherein the one or more first optical pump sources are configured to pump the optical fiber amplifying system in a co-pumping configuration.

Embodiment 4

The optical fiber amplifying system according to embodiment 1 or embodiment 2, wherein the one or more first optical pump sources serve to pump the optical fiber amplifying system in a counter-pumping configuration.

Embodiment 5

The optical fiber amplifying system according to any of embodiments 1-4, wherein the bridge optical fiber has a substantially circular cross-sectional shape.

Embodiment 6

The optical fiber amplifying system according to any of embodiments 1-5, wherein the optical path length of the bridge optical fiber is less than 10 m.

Embodiment 7

The optical fiber amplifying system according to any of embodiments 1-5, wherein the optical path length of the bridge optical fiber is less than 5 m.

Embodiment 8

The optical fiber amplifying system according to any of embodiments 1-7, wherein the optical path length of the bridge optical fiber is greater than 1 m.

Embodiment 9

The optical fiber amplifying system according to any of embodiments 1-7, wherein the optical path length of the bridge optical fiber is greater than 50 cm.

Embodiment 10

The optical fiber amplifying system according to any of embodiments 1-7, wherein the optical path length of the bridge optical fiber is greater than 10 cm.

Embodiment 11

The optical fiber amplifying system according to any of embodiments 1-10, wherein the inner core of the bridge optical fiber has a substantially circular cross-sectional shape.

Embodiment 12

The optical fiber amplifying system according to any of embodiments 1-11, wherein the overlap between the distribution of the intensity at the pump wavelength carried by the bridge optical fiber at its second end and the active core of the active optical fiber is no more than about 30%.

Embodiment 13

The optical fiber amplifying system according to any of embodiments 1-11, wherein the overlap between the distribution of the intensity at the pump wavelength carried by the bridge optical fiber at its second end and the active core of the active optical fiber is no more than about 20%, no more than about 10%, or no more than about 5%.

Embodiment 14

The optical fiber amplifying system according to any of embodiments 1-13, wherein the overlap between the intensity distribution at the pump wavelength at the second end of the bridge optical fiber and the intensity distribution at the active wavelength at the first end of the active optical fiber is no more than about 30%.

Embodiment 15

The optical fiber amplifying system according to any of embodiments 1-13, wherein the overlap between the intensity distribution at the pump wavelength at the second end of the bridge optical fiber and the intensity distribution at the active wavelength at the first end of the active optical fiber is no more than about 20%, no more than about 10%, or no more than about 5%.

Embodiment 16

The optical fiber amplifying system according to any of embodiments 1-15, wherein the overlap between the intensity distribution at the pump wavelength at the second end of the bridge optical fiber and the intensity distribution at the active wavelength at the first end of the active optical fiber is no more than about 30%.

Embodiment 17

The optical fiber amplifying system according to any of embodiments 1-15, wherein the overlap between the intensity distribution at the pump wavelength at the second end of the bridge optical fiber and the intensity distribution at the active wavelength at the first end of the active optical fiber is no more than about 20%, no more than about 10%, or no more than about 5%.

Embodiment 18

The optical fiber amplifying system according to any of embodiments 1-17, wherein the overlap between the intensity distribution at the pump wavelength at the second end of the bridge optical fiber and the intensity distribution at the active wavelength at the second end of the bridge optical fiber is no more than about 30%.

Embodiment 19

The optical fiber amplifying system according to any of embodiments 1-17, wherein the overlap between the intensity distribution at the pump wavelength at the second end of the bridge optical fiber and the intensity distribution at the active wavelength at the second end of the bridge optical fiber is no more than about 20%, no more than about 10%, or no more than about 5%.

Embodiment 20

The optical fiber amplifying system according to any of embodiments 16-19, wherein a seed source is present and is coupled to the input end of the bridge optical fiber.

Embodiment 21

The optical fiber amplifying system according to any of embodiments 1-20, wherein each of the inner core, the one or more first claddings (if present), the annular pump core, and the one or more outer claddings exclusive of any outer claddings that are polymeric materials comprises at least 60% silicon dioxide.

Embodiment 22

The optical fiber amplifying system according to any of embodiments 1-20, wherein each of the inner core, the one or more first claddings (if present), the annular pump core and the one or more outer claddings exclusive of any outer claddings that are polymeric materials comprises at least 75% silicon dioxide.

Embodiment 23

The optical fiber amplifying system according to any of embodiments 1-20, wherein each of the inner core, the one or more first claddings (if present), the annular pump core and the one or more outer claddings exclusive of any outer claddings that are polymeric materials comprises at least 85% silicon dioxide.

Embodiment 24

The optical fiber amplifying system according to any of embodiments 1-23, wherein one or more of the one or more first claddings is a pedestal cladding disposed immediately adjacent to the inner core.

Embodiment 25

The optical fiber amplifying system according to embodiment 24, wherein the inner core is single moded at the active wavelength.

Embodiment 26

The optical fiber amplifying system according to any of embodiments 1-25, wherein the one or more first claddings (when present), the inner core and the one or more outer claddings are configured to substantially confine a plurality of modes at the pump wavelength in the annular pump core.

Embodiment 27

The optical fiber amplifying system according to any of embodiments 1-26, wherein the one or more first claddings are present.

Embodiment 28

The optical fiber amplifying system according to any of embodiments 1-27, wherein the output end of the bridge optical fiber and the first end of the active optical fiber are directly interconnected by a fusion splice.

Embodiment 29

The optical fiber amplifying system according to any of embodiments 1-28, wherein the active optical fiber has substantially the same outer diameter as the bridge optical fiber, exclusive of any polymeric coatings.

Embodiment 30

The optical fiber amplifying system according to any of embodiments 1-29, wherein the active core of the active optical fiber is a rare earth doped core.

Embodiment 31

The optical fiber amplifying system according to embodiment 30, wherein the rare earth is neodymium, ytterbium, erbium, thulium, praseodymium, holmium, or a combination thereof.

Embodiment 32

The optical fiber amplifying system according to embodiment 30, wherein the rare earth is thulium.

Embodiment 33

The optical fiber amplifying system according to embodiment 30, wherein the rare earth is ytterbium.

Embodiment 34

The optical fiber amplifying system according to any of embodiments 1-33, further comprising a seed optical source configured to provide radiation of the first amplified wavelength to the active optical fiber.

Embodiment 35

The optical fiber amplifying system according to embodiment 34, wherein the seed optical source is optically coupled through the bridge optical fiber to the first end of the active optical fiber.

Embodiment 36

The optical fiber amplifying system according to embodiment 34, wherein the seed optical source is optically coupled to the second end of the active optical fiber.

Embodiment 37

The optical fiber amplifying system according to any of embodiments 1-36, further comprising a pump coupler or combiner having one or more pump input ports, each pump input port being optically coupled to one of the one or more pump sources, and an output port optically coupled to the input port of the bridge optical fiber.

Embodiment 38

The optical fiber amplifying system according to embodiment 37, wherein the pump coupler or combiner is a multimode combiner.

Embodiment 39

The optical fiber amplifying system according to embodiment 37 or embodiment 38, wherein the output port of the pump coupler or combiner is operatively coupled to the input of the bridge optical fiber.

Embodiment 40

The optical fiber amplifying system according to any of embodiments 37-39, wherein the pump coupler or combiner further includes a signal port, with the pump coupler or combiner being configured to transmit radiation of the amplified wavelength between the signal port and the output port.

Embodiment 41

A method for generating or amplifying optical radiation having an active wavelength, the method comprising
providing an optical fiber amplifying system according to any of embodiments 1-40;
transmitting radiation of the pump wavelength from the one or more first optical pump sources to the input end of the bridge optical fiber;
transmitting the radiation of the pump wavelength from the input end of the bridge optical fiber to the output end of the bridge optical fiber; and
transmitting the radiation of the pump wavelength from the output end of the bridge optical fiber to the first end of the active optical fiber, thereby generating or amplifying radiation of the active wavelength in the active optical fiber.

Embodiment 42

The method according to embodiment 41, further comprising transmitting radiation of the active wavelength from a seed source to the active core of active optical fiber.

Embodiment 43

The method according to embodiment 42, wherein the radiation of the active wavelength is transmitted from the seed source to the active core of the active optical fiber through the inner core of the bridge optical fiber and through the first end of the active optical fiber.

Embodiment 44

The method according to embodiment 43, wherein the radiation of the active wavelength is transmitted from the seed source to the active core of the active optical fiber through the second end of the active optical fiber.

Embodiment 45

The method according to any of embodiments 42-44, wherein the maximum temperature reached in the first five centimeters of the active optical fiber at the first end thereof is no more than about 250° C.

Embodiment 46

The method according to embodiments 42-45, wherein at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 30% of the radiation of the pump wavelength.

Embodiment 47

The method according to any of embodiments 42-45, wherein at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 25%, less than 20%, less than 15%, less than 10%, less than 5% or even less than 1% of the radiation of the pump wavelength.

Embodiment 48

The method according to any of embodiments 42-47, wherein at the output end of the bridge optical fiber, radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 30% of the radiation of the pump wavelength.

Embodiment 49

The method according to any of embodiments 42-47, wherein at the output end of the bridge optical fiber, radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 25%, less than 20%, less than 15%, less than 10%, less than 5%, or even less than 1% of the radiation of the pump wavelength.

Embodiment 50

A method or system as recited in any of the above embodiments, wherein the one or more first claddings have an average refractive index at least 0.001, at least 0.002, or at least 0.003 less than the refractive index of the core (at the active wavelength).

Embodiment 51

A method or system as recited in any of the above embodiments, wherein the one or more first claddings have an average refractive index at least 0.001, at least 0.002, or at least 0.003 less than the refractive index of the annular pump core (at the pump wavelength).

Embodiment 52

A method or system as recited in any of the above embodiments, wherein the one or more first claddings are at least 10 microns in thickness, at least 20 microns in thickness, at least 30 microns in thickness, or even at least 40 microns in thickness.

Embodiment 53

A bridge optical fiber as described in any of the above embodiments.

Embodiment 54

An active bridge optical fiber having one or more rare earths doped in the inner core, and as otherwise described in any of the above embodiments.

Embodiment 55

An optical fiber coupler having as its output optical fiber a bridge optical fiber as described in any of the above embodiments.

In the claims as well as in the specification above all transitional phrases such as "comprising", "including", "carrying", "having", "containing", "involving", and the like are understood to be open-ended. Only the transitional phrases "consisting of" and "consisting essentially of" shall be closed or semi-closed transitional phrases, respectively.

It is understood that the use of the term "a", "an", or "one" herein, including in the appended claims, is open-ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an", or "one" alone in other instances herein is closed and hence limited to the singular. Similarly, the use of "a part of", "at least a part of", or similar phrases (e.g., "at least a portion of") shall not be taken to mean that the absence of such a phrase elsewhere is somehow limiting.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine, or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

It will be apparent to those skilled in the art that various modifications and variations can be made to the methods and systems of the present disclosure without departing from the scope thereof. Thus, it is intended that the present disclosure cover such modifications and variations provided they come within the scope of the appended claims and their equivalents.

What is claimed:

1. An optical fiber amplifying system, the optical fiber amplifying system providing amplified optical radiation having an active wavelength, the optical fiber amplifying system comprising:
one or more first optical pump sources, each configured to output radiation of a pump wavelength;
a bridge optical fiber, having an input end configured to receive the radiation of the pump wavelength output by the one or more first optical pump sources and an output end, the bridge optical fiber comprising:
an inner core configured to guide radiation of the active wavelength, the inner core having an inner core active wavelength refractive index profile and an inner core pump wavelength refractive index profile;
an annular pump core disposed about the inner core, the annular pump core being configured to guide radiation of the pump wavelength, the annular pump core having an annular pump core active wavelength refractive index profile and an annular pump core pump wavelength refractive index profile;
one or more first claddings disposed between the inner core and the annular pump core, the one or more first claddings having a first cladding active wavelength refractive index profile and a first cladding pump wavelength refractive index profile; and
one or more outer claddings disposed about the annular pump core, the one or more outer claddings having an outer cladding active wavelength refractive index profile and an outer cladding pump wavelength refractive index profile;
wherein the one or more first claddings and the annular pump core are configured to substantially confine one or more guided modes at the active wavelength in the inner core, and wherein less than 30% of the intensity distribution at the pump wavelength at the output end of the bridge optical fiber overlaps the inner core of the active optical fiber, and an active optical fiber having a first end substantially directly coupled to the output end of the bridge optical fiber, and a second end, the active optical fiber having an active core, a pump cladding surrounding the active core, and one or more outer claddings surrounding the pump cladding, the active optical fiber being configured to amplify radiation of the first active wavelength when pumped with radiation of the pump wavelength.

2. The optical fiber amplifying system according claim 1, wherein the one or more first optical pump sources comprise one or more laser diodes.

3. The optical fiber amplifying system according to claim 1, wherein the optical path length of the bridge optical fiber is greater than 50 cm.

4. The optical fiber amplifying system according to claim 1, wherein the optical path length of the bridge optical fiber is greater than 10 cm.

5. The optical fiber amplifying system according to claim 1, wherein the overlap between the distribution of the intensity at the pump wavelength carried by the bridge optical fiber at its output end and the active core of the active optical fiber is no more than about 30%.

6. The optical fiber amplifying system according to claim 1, wherein the overlap between the intensity distribution at the pump wavelength at the output end of the bridge optical fiber and the intensity distribution at the active wavelength at the first end of the active optical fiber is no more than about 30%.

7. The optical fiber amplifying system according to claim 1, wherein the overlap between the intensity distribution at the pump wavelength at the output end of the bridge optical fiber and the intensity distribution at the active wavelength at the output end of the bridge optical fiber is no more than about 30%.

8. The optical fiber amplifying system according to claim 1, wherein each of the inner core, the one or more first claddings, the annular pump core and the one or more outer claddings exclusive of any outer claddings that are polymeric materials comprises at least 75% silicon dioxide.

9. The optical fiber amplifying system according to claim 1, wherein one or more of the one or more first claddings is a pedestal cladding disposed immediately adjacent to the inner core.

10. The optical fiber amplifying system according to claim 9, wherein the inner core is single moded at the active wavelength.

11. The optical fiber amplifying system according to claim 1, wherein the one or more first claddings, the inner core and the one or more outer claddings are configured to substantially confine a plurality of modes at the pump wavelength in the annular pump core.

12. The optical fiber amplifying system according to claim 1, wherein the one or more first claddings are at least 30 microns in thickness.

13. The optical fiber amplifying system according to claim 1, wherein the output end of the bridge optical fiber and the first end of the active optical fiber are directly interconnected by a fusion splice.

14. The optical fiber amplifying system according to claim 13, wherein the rare earth is thulium or ytterbium.

15. The optical fiber amplifying system according to claim 1, further comprising a seed optical source configured to provide radiation of the first amplified wavelength to the active optical fiber.

16. The optical fiber amplifying system according to claim 1, further comprising a pump coupler or combiner having one or more pump input ports, each pump input port being optically coupled to one of the one or more pump sources, and an output port optically coupled to the input port of the bridge optical fiber.

17. A method for generating or amplifying optical radiation having an active wavelength, the method comprising
providing an optical fiber amplifying system according to claim 1;
transmitting radiation of the pump wavelength from the one or more first optical pump sources to the input end of the bridge optical fiber;
transmitting the radiation of the pump wavelength from the input end of the bridge optical fiber to the output end of the bridge optical fiber; and
transmitting the radiation of the pump wavelength from the output end of the bridge optical fiber to the first end of the active optical fiber, thereby generating or amplifying radiation of the active wavelength in the active optical fiber.

18. The method according to claim 17, further comprising transmitting radiation of the active wavelength from a seed source to the active core of the active optical fiber.

19. The method according to claim 17 wherein the maximum temperature reached in the first five centimeters of the active optical fiber at the first end thereof is no more than about 250° C.

20. The method according to claim 17, wherein at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 20% of the radiation of the pump wavelength.

21. A bridge optical fiber comprising
an inner core configured to guide radiation of the active wavelength, the inner core having an inner core active wavelength refractive index profile and an inner core pump wavelength refractive index profile;
an annular pump core disposed about the inner core, the annular pump core being configured to guide radiation of the pump wavelength, the annular pump core having an annular pump core active wavelength refractive index profile and an annular pump core pump wavelength refractive index profile;
one or more first claddings disposed between the inner core and the annular pump core, the one or more first claddings having a first cladding active wavelength refractive index profile and a first cladding pump wavelength refractive index profile; and
one or more outer claddings disposed about the annular pump core, the one or more outer claddings having an outer cladding active wavelength refractive index profile and an outer cladding pump wavelength refractive index profile;
wherein the one or more first claddings and the annular pump core are configured to substantially confine one or more guided modes at the active wavelength in the inner core, and wherein less than 30% of the intensity distribution at the pump wavelength at the output end of the bridge optical fiber overlaps the inner core of the active optical fiber.

22. A method for generating or amplifying optical radiation having an active wavelength, the method comprising providing an optical fiber amplifying system comprising:

one or more first optical pump sources, each configured to output radiation of a pump wavelength;

a bridge optical fiber, having an input configured to receive the radiation of the pump wavelength output by the one or more first optical pump sources and an output, the bridge optical fiber comprising:

an inner core configured to guide radiation of the active wavelength, the inner core having an inner core active wavelength refractive index profile and an inner core pump wavelength refractive index profile;

an annular pump core disposed about the inner core, the annular pump core being configured to guide radiation of the pump wavelength, the annular pump core having an annular pump core active wavelength refractive index profile and an annular pump core pump wavelength refractive index profile; and one or more outer claddings disposed about the annular pump core, the one or more outer claddings having an outer cladding active wavelength refractive index profile and an outer cladding pump wavelength refractive index profile; and an active optical fiber having a first end substantially directly coupled to the output end of the bridge optical fiber, and a second end, the active optical fiber having an active core, a pump cladding surrounding the active core, and one or more outer claddings surrounding the pump cladding, the active optical fiber being configured to amplify radiation of the first active wavelength when pumped with radiation of the pump wavelength;

transmitting radiation of the pump wavelength from the one or more first optical pump sources to the input end of the bridge optical fiber;

transmitting the radiation of the pump wavelength from the input end of the bridge optical fiber to the output end of the bridge optical fiber; and transmitting the radiation of the pump wavelength from the output end of the bridge optical fiber to the first end of the active optical fiber, thereby generating or amplifying radiation of the active wavelength in the active optical fiber, wherein the bridge optical fiber substantially confines one or more guided modes of the radiation of the active wavelength in the inner core thereof, less than 30% of the intensity distribution at the pump wavelength at the second end of the bridge optical fiber overlaps the inner core of the active optical fiber, and wherein at the first end of the active optical fiber, the radiation of the active wavelength is spatially overlapped, in a region whose edges are defined by the points where the radiation intensity of the active wavelength is 5% of the peak intensity of the radiation of the active wavelength, by radiation of the pump wavelength in an amount corresponding to less than 25% of the radiation of the pump wavelength.

23. The method according to claim 22 wherein the maximum temperature reached in the first five centimeters of the active optical fiber at the first end thereof is no more than about 250° C.

* * * * *